(12) United States Patent
Hosomi et al.

(10) Patent No.: US 7,664,900 B2
(45) Date of Patent: Feb. 16, 2010

(54) MULTIPROCESSOR SYSTEM AND METHOD FOR PROCESSING MEMORY ACCESS

(75) Inventors: Takeo Hosomi, Tokyo (JP); Yoshiaki Watanabe, Kofu (JP)

(73) Assignees: NEC Corporation, Tokyo (JP); NEC Computertechno, Ltd., Yamanashi (JP)

( * ) Notice: Subject to any disclaimer, the term of this patent is extended or adjusted under 35 U.S.C. 154(b) by 183 days.

(21) Appl. No.: 10/586,153

(22) PCT Filed: Jul. 1, 2005

(86) PCT No.: PCT/JP2005/012631

§ 371 (c)(1),
(2), (4) Date: Jul. 31, 2007

(87) PCT Pub. No.: WO2006/004196

PCT Pub. Date: Jan. 12, 2006

(65) Prior Publication Data

US 2008/0244134 A1    Oct. 2, 2008

(30) Foreign Application Priority Data

Jul. 2, 2004    (JP) ............................. 2004-197296

(51) Int. Cl.
*G06F 12/00*   (2006.01)
*G06F 12/14*   (2006.01)
*G06F 13/14*   (2006.01)

(52) U.S. Cl. .................. 710/200; 710/240; 710/241; 710/242; 710/243; 710/244

(58) Field of Classification Search .............. 710/200, 710/240–244
See application file for complete search history.

(56) References Cited

U.S. PATENT DOCUMENTS

| | | | | |
|---|---|---|---|---|
| 4,435,766 A | * | 3/1984 | Haber et al. | 710/200 |
| 5,551,046 A | * | 8/1996 | Mohan et al. | 707/8 |
| 5,673,399 A | * | 9/1997 | Guthrie et al. | 710/311 |
| 5,694,556 A | * | 12/1997 | Neal et al. | 710/310 |

(Continued)

FOREIGN PATENT DOCUMENTS

JP    9-6717 A    1/1997

(Continued)

*Primary Examiner*—Mark Rinehart
*Assistant Examiner*—Jeremy S Cerullo
(74) *Attorney, Agent, or Firm*—Sughrue Mion, PLLC

(57) ABSTRACT

When receiving a write message associated with data, an input/output controller issues a write-request message to a home processor node which holds the data in a memory. When receiving the write-request message, a memory controller in the processor node executes a consistency process on the basis of information, regarding the state of the data, stored in a directory, and sends a write-permission message to the input/output controller which has issued the write-request message. In response to the received write-permission message, the input/output controller in an input/output node issues an update message, serving as a write message, to the home processor node. In response to the received update message, the memory controller in the process node updates the data in the main memory. In the above process, when receiving a plurality of write messages from input/output devices, the input/output controller issues write-request messages irrespective of the progress of a preceding write message. After the preceding write message is issued, the input/output controller issues the write messages.

12 Claims, 16 Drawing Sheets

U.S. PATENT DOCUMENTS

| | | | |
|---|---|---|---|
| 6,138,192 A * | 10/2000 | Hausauer | 710/100 |
| 6,182,186 B1 * | 1/2001 | Daynes | 710/200 |
| 6,353,869 B1 * | 3/2002 | Ofer et al. | 710/200 |
| 7,174,406 B1 * | 2/2007 | Abdallah et al. | 710/240 |
| 7,380,247 B2 * | 5/2008 | Accapadi et al. | 718/103 |

FOREIGN PATENT DOCUMENTS

| | | |
|---|---|---|
| JP | 9-146903 A | 6/1997 |
| JP | 9-198336 A | 7/1997 |
| JP | 10-301893 A | 11/1998 |
| JP | 10-307802 A | 11/1998 |
| JP | 2001-216259 A | 8/2001 |
| JP | 3579198 B2 | 7/2004 |

* cited by examiner

Prior Art

Prior Art

STEP ST4

STEP ST5

STEP ST6

# MULTIPROCESSOR SYSTEM AND METHOD FOR PROCESSING MEMORY ACCESS

This application claims priority from PCT Application No. PCT/JP2005/012631 filed Jul. 1, 2005, and from Japanese Patent Application No. 2004-197296 filed Jul. 2, 2004, which applications are incorporated herein by reference.

TECHNICAL FIELD

The present invention relates to tightly-coupled shared-memory multiprocessor systems, and in particular, relates to a multiprocessor system for processing memory access from input/output devices and a method for processing the memory access.

BACKGROUND ART

Provisions of, e.g., PCI Bus Specification Revision 2.1 include a constraint that the order of write messages from input/output devices, serving as sources, arranged on a PCI bus must be ensured. In other words, it must be ensured that the preceding write message is processed and, after that, the following write message is processed.

FIG. 1 is a diagram showing the structure of a multiprocessor system for ensuring consistency of data in accordance with a directory method. The multiprocessor system includes a plurality of processor nodes 101-1, ..., 101-i, and 101-m (i and m are integers of 2 or more), and a plurality of input/output nodes 103-1, ..., 103-j, ... 103-n (and n are integers of 2 or more). The processor nodes 101-1 to 101-m and the input/output nodes 103-1 to 103-n are connected to a network 102 and each of them is operated in response to a clock externally supplied. The processor node 101-1 includes processors 110-1-1 and 110-1-2, a directory 120-1, a main memory (memory) 130-1, and a memory controller 140-1. The other processor nodes have the same structure. Each main memory stores a plurality of data. Each data includes a value indicating descriptions of the data. On the other hand, the input/output node 103-1 includes an input/output controller 150-1 and a plurality of input/output devices 160-1-1 and 160-1-2, each device issuing a message in accordance with a command externally supplied. The other input/output nodes have the same structure. In the following description, an explanation may be made using reference numerals which are not shown in FIG. 1 for the sake of convenience. For example, although the processor node 101-2 is not shown in the diagram, it includes a main memory 130-2, a memory controller 140-2, and so forth.

A conventional art which satisfies the above-described constraint on the order of write messages in a multiprocessor system as shown in FIG. 1 will be described. Japanese Unexamined Patent Application Publication No. 2001-216259 (hereinafter, referred to as Patent Document 1) discloses a technique (hereinbelow, referred to as Related Art 1) which satisfies the order constraint by suspending issuing of a write message until the completion of the preceding write message is ensured, the technique being described in "Problems to be Solved by the Invention" in Patent Document 1.

The operation according to Related Art 1 in a case where write messages are successively issued on the order constraint will now be described with reference to FIGS. 1 and 2. FIG. 2 shows the operation in a case where the input/output device 160-1-1 issues write messages for data A, B, and C in steps 1, 2, and 3, respectively. It is assumed that the data A and the data B are originated (homed) at the processor node 101-1 and the data C is homed at the processor node 101-2 (not shown). One step corresponds to one clock.

In step 2, the input/output controller 150-1 receives a write A message, serving as a write message, from the input/output device 160-1-1. In step 3, the input/output controller 150-1 outputs an update A message, including a value specified in the write A message, through the network 102 to the home memory controller 140-1.

In step 4, the memory controller 140-1 updates the value included in the corresponding data stored in the main memory 130-1 to the value specified in the update A message in response to the update A message sent from the input/output controller 150-1. In step 5, the memory controller 140-1 outputs a complete A message through the network 102 to the input/output controller 150-1. In step 6, the input/output controller 150-1 receives the complete A message from the memory controller 140-1, thus recognizing that the preceding write A has been completed.

In addition, in step 3, the input/output controller 150-1 receives a write B message, serving as a second write message. In this instance, the input/output controller 150-1 suspends the write B message until the preceding write A is completed, i.e., step 6. In step 7, the input/output controller 150-1 outputs an update B message including a value designated in the write B message through the network 102 to the memory controller 140-1.

In step 8, the memory controller 140-1 updates the value in the corresponding data stored in the main memory 130-1 to the value designated in the update B message in response to the update B message sent from the input/output controller 150-1. In step 9, the memory controller 140-1 outputs a complete B message through the network 102 to the input/output controller 150-1. In step 10, the input/output controller 150-1 receives the complete B message from the memory controller 140-1, thus recognizing that the preceding write B has been completed.

In step 4, the input/output controller 150-1 also receives a write C message, serving as a third write message. In this case, the input/output controller 150-1 suspends the write C message until the preceding write A and write B are completed, i.e., step 10. In step 11, the input/output controller 150-1 outputs an update C message including a value designated in the write C message through the network 102 to the memory controller 140-2 (not shown).

In step 12, the memory controller 140-2 updates the value in the corresponding data stored in the main memory 130-2 (not shown) to the value specified in the update C message in response to the update C message sent from the input/output controller 150-1. In step 13, the memory controller 140-2 outputs a complete C message through the network 102 to the input/output controller 150-1. In step 14, the input/output controller 150-1 receives the complete C message from the memory controller 140-2, thus recognizing that the write C has been completed.

As described above, the input/output controller 150-1 issues a write message after the preceding write message is completed, so that the order of a plurality of write messages issued by the input/output devices 160-1-1 and 160-1-2 can be ensured. However, processing three write messages requires 14 steps. The same applies to the other input/output controllers.

Patent Document 1 also discloses a technique (hereinafter, referred to as Related Art 2) for solving such a problem that processing time for write messages is long. The problem results in a degradation in performance. Related Art 2 permits the issuing of successive write messages addressed to the same processor node, i.e., the issuing of the following messages before the completion of the preceding message is ensured.

The operation according to Related Art 2 will now be described with reference to FIGS. 1 and 3.

In step 2, the input/output controller 150-1 receives a write A message, serving as a first write message, and recognizes that the write A message relates to the write operation for updating data homed at the processor node 101-1 (memory controller 140-1). In step 3, the input/output controller 150-1 outputs an update A message including a value specified in the write A message through the network 102 to the home memory controller 140-1.

In step 4, the memory controller 140-1 updates the corresponding data stored in the main memory 130-1 in response to the update A message sent from the input/output controller 150-1. In step 5, the memory controller 140-1 outputs a complete A message through the network 102 to the input/output controller 150-1. In step 6, the input/output controller 150-1 receives the complete A message from the memory controller 140-1 and recognizes that the preceding write operation A has been completed.

In step 3, the input/output controller 150-1 also receives a write B message, serving as a second write message. The input/output controller 150-1 recognizes that the write B message relates to the write operation for updating other data homed at the processor node 101-1 (memory controller 140-1), i.e., recognizes that the target data of the current message is originated from the same home as that associated with the preceding write A message. In this case, in step 4, the input/output controller 150-1 outputs an update B message including a value specified in the write B message through the network 102 to the home memory controller 140-1 without waiting the completion of the write A.

In step 5, in response to the update B message sent from the input/output controller 150-1, the memory controller 140-1 updates the corresponding data stored in the main memory 130-1. In step 6, the memory controller 140-1 outputs a complete B message through the network 102 to the input/output controller 150-1. In step 7, the input/output controller 150-1 receives the complete B message from the memory controller 140-1.

In step 4, the input/output controller 150-1 further receives a write C message, serving as a third write message. The input/output controller 150-1 recognizes that the write C message relates to the write operation for updating data homed at the processor node 101-2 (memory controller 140-2), which are not shown in the diagram, and also recognizes that the target data of the current message is originated from the home node different from that associated with the preceding write A message and write B message. In this case, the input/output controller 150-1 suspends the write C message until step 7 in which both of the write messages (write A message, write B message) are completed. In step 8, the input/output controller 150-1 outputs an update C message including a value designated in the write C message through the network 102 to the memory controller 140-2.

In step 9, in response to the update C message sent from the input/output controller 150-1, the memory controller 140-2 updates the corresponding data unit stored in the main memory 130-2. In step 10, the memory controller 140-2 outputs a complete C message through the network 102 to the input/output controller 150-1. In step 11, the input/output controller 150-1 receives the complete C message from the memory controller 140-1 and recognizes that the write C has been completed.

As described above, the input/output controller 150-1 successively issues write messages associated with the same home and then issues a write message associated to another home after the preceding write messages are completed. The network 102 ensures the order of messages between two points. Accordingly, in the above-described example, it is ensured that the write A message and the write B message reach the memory controller 140-1 in this order. Therefore, the memory controller 140-1 does not process the write B message before processing the write A message. The order of these messages can be ensured.

In Related Art 2, however, processing three write messages requires 11 steps.

In Related Arts 1 and 2, each input/output controller cannot successively process a plurality of write messages, supplied from the corresponding input/output devices, addressed to different processor nodes. Disadvantageously, it takes long time to process the write messages through the input/output controller.

It is an object of the present invention to provide a multiprocessor system capable of successively processing a plurality of write messages, supplied from input/output devices, addressed to different processor nodes.

Another object of the present invention is to provide a multiprocessor system capable of reducing the time required to process write messages through each input/output controller.

DISCLOSURE OF INVENTION

A processor system according to the present invention includes a plurality of resource nodes connected to a network, a plurality of control nodes connected to the network, and a plurality of controllers.

Each of the resource nodes includes a resource holding unit for holding a plurality of resources and a resource information holding unit for managing the states of the resources, each state indicating that the corresponding resource is in a free or locked state.

Each of the control nodes includes a plurality of control devices for issuing a plurality of requests associated with resources.

Each control node, including the control devices which have issued requests, transfers the requests to the corresponding controller.

At least one controller, which has received the requests, issues a request message to each of resource nodes which hold target resources associated with the requests.

Each resource node which has received the request message checks that the target resource is in the free state, changes the state of the target resource to the locked state, and issues a permission message to the at least one controller.

The at least one controller, which has received the permission message, checks that all of permission messages associated with other requests preceding the corresponding request received by the at least one controller have already been received and issues an update message to the resource node which holds the target resource associated with the corresponding request.

The resource node which has received the update message changes the state of the target resource to the free state.

In the processor system according to the present invention, the controllers may be included in the control nodes, respectively. In this case, preferably, the controller in each control node includes a selector for arranging the requests issued by the control devices in the control node.

In the processor system according to the present invention, the controllers may be connected to the network. In this case, preferably, each control node includes a selector for arranging the requests issued by the control devices in the control node.

In the processor system according to the present invention, the controllers may be included in the resource nodes, respectively. In this case, preferably, each control node includes a selector for arranging the requests issued by the control devices in the control node.

In the processor system according to the present invention, the resource nodes and the control nodes may be combined into a plurality of nodes, respectively. In this case, preferably, each node includes a selector for arranging the requests issued by the control devices in the node.

In the processor system according to the present invention, each controller may include a release processing unit. In this case, each resource node which has received the request message issues a release-request message to the at least one controller when the target resource is in the locked state.

In the at least one controller which has received the release-request message, the release processing unit starts a release process.

The release process includes a step of issuing a request message to the resource node which holds the target resource associated with the corresponding request, a step of stopping accepting of a new request, and a step of issuing a release message to each of resource nodes which hold target resources associated with requests following the corresponding request received by the at least one controller when permission messages associated with the following requests have already been received or are received during the release process.

The at least one controller, which has received a permission message sent in response to the release-request message, terminates the release process.

In the processor system according to the present invention, each state managed by the resource information holding unit may include an interruptible locked state and a request-locked state. In this case, the at least one controller, which has received the request, issues a weak request message when all of permission messages associated with other requests preceding the request received by the at least one controller have not yet been received.

The resource node which has received the weak request message checks that the target resource is in the free state, changes the state of the target resource to the interruptible locked state, and issues a permission message to the at least one controller.

The interruptible locked state may include information to specify the at least one controller.

The resource node which has received the request message issues an inhibition message to the at least one controller when the target resource is in the locked state.

The resource node which has received the weak request message issues an inhibition message to the at least one controller when the target resource is in the locked state or the interruptible locked state.

The at least one controller which has received the inhibition message issues a request message when all of permission messages associated with other requests preceding the request received by the at least one controller have already been received, or issues a weak request message when all of the permission messages have not yet been received.

When the target resource is in the interruptible locked state, the resource node which has received the request message changes the state of the target resource to the request-locked state and then outputs a retry-request message to a controller designated by the information included in the interruptible locked state.

The controller which has received the retry-request message executes a retry process.

The retry process includes a step of specifying a request associated with the target resource, a step of issuing a release message to the resource node which holds the target resource associated with the specified request, and a step of changing the state of the specified request to a state in which a permission message associated therewith has not yet been received when an update message has not yet been issued in response to the specified request, and issuing a request message when all of permission messages associated with other requests preceding the specified request received by the controller have already been received, or issuing a weak request message when all of the permission messages have not yet been received.

The resource node which has received the release message changes the state of the target resource to the locked state and issues a permission message to the at least one controller.

An access processing method according to the present invention is applied to a processor system including a plurality of resource nodes connected to a network, a plurality of control nodes connected to the network, and a plurality of controllers, each of the resource nodes including a resource holding unit for holding a plurality of resources and a resource information holding unit for managing the states of the resources, each state indicating that the corresponding resource is in a free or locked state, each of the control nodes including a plurality of control devices for issuing a plurality of requests associated with resources.

The access processing method according to the present invention includes a step of transferring requests to at least one corresponding controller, a step of issuing a request message to each resource node which holds the target resource associated with the corresponding request, a step of checking that the target resource is in the free state, changing the state of the target resource to the locked state, and issuing a permission message to the at least one controller, a step of checking that all of permission messages associated with other requests preceding the corresponding request received by the at least one controller have already been received and issuing an update message to the resource node which holds the target resource associated with the corresponding request, and a step of changing the state of the target resource to the free state.

In each of the processor system and the access processing method according to the present invention, preferably, each of the resource nodes is a processor node having a plurality of processors. In this case, each of the processor nodes includes a main memory serving as the resource holding unit, a directory serving as the resource information holding unit, and a memory controller connected to the processors, the main memory, and the directory. In addition, each of the control nodes is an input/output node including a plurality of input/output devices serving as the control devices. Each of the controllers is an input/output controller. Each input/output device issues a write message as a request. In response to the write message, the corresponding input/output controller output a write-request message to a target processor node.

BEST MODE FOR CARRYING OUT THE INVENTION

A multiprocessor system according to the present invention will now be described in detail below.

Figure 1:
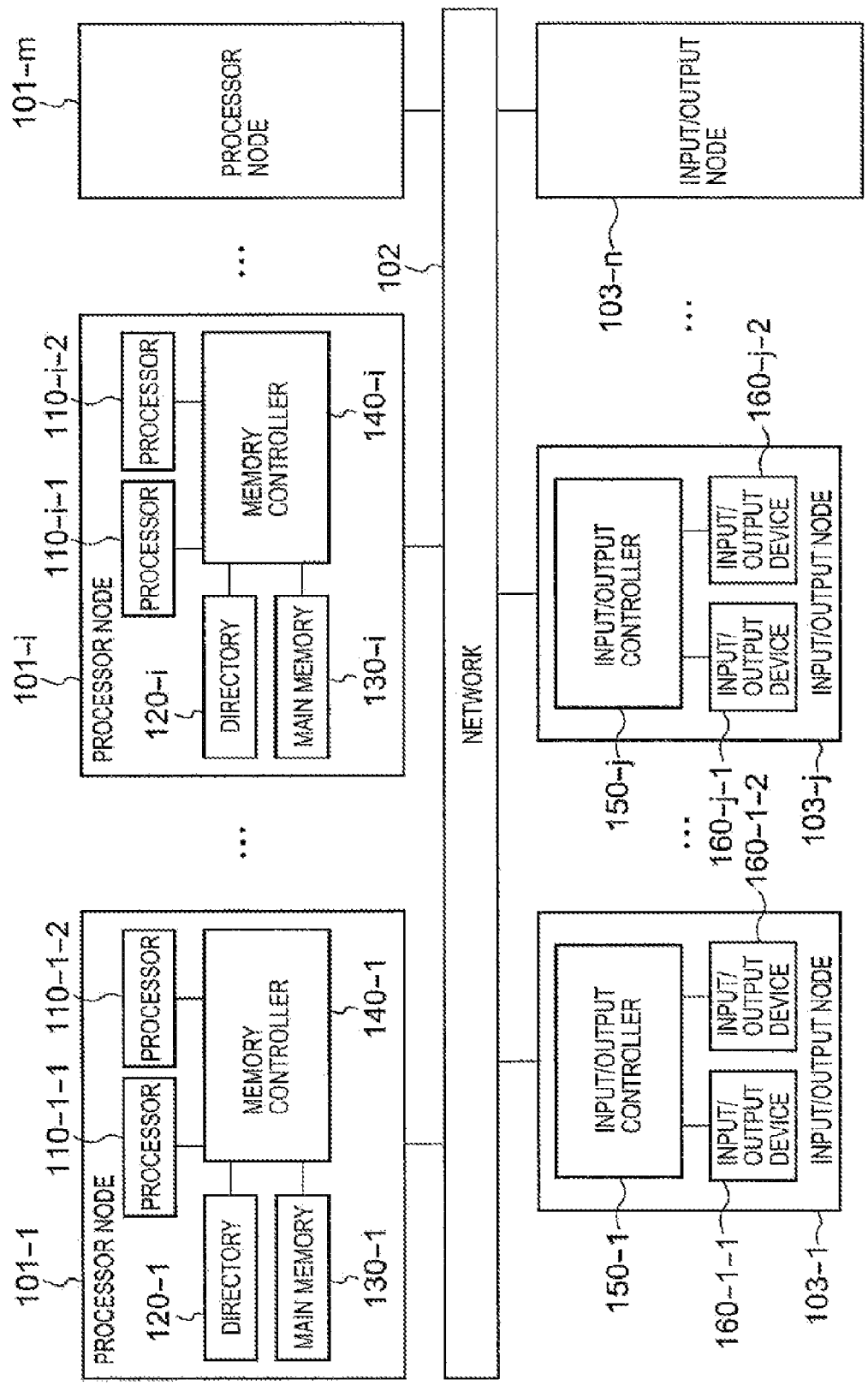
FIG. 1 is a diagram showing the structure of a conventional multiprocessor system.
Figure 2:
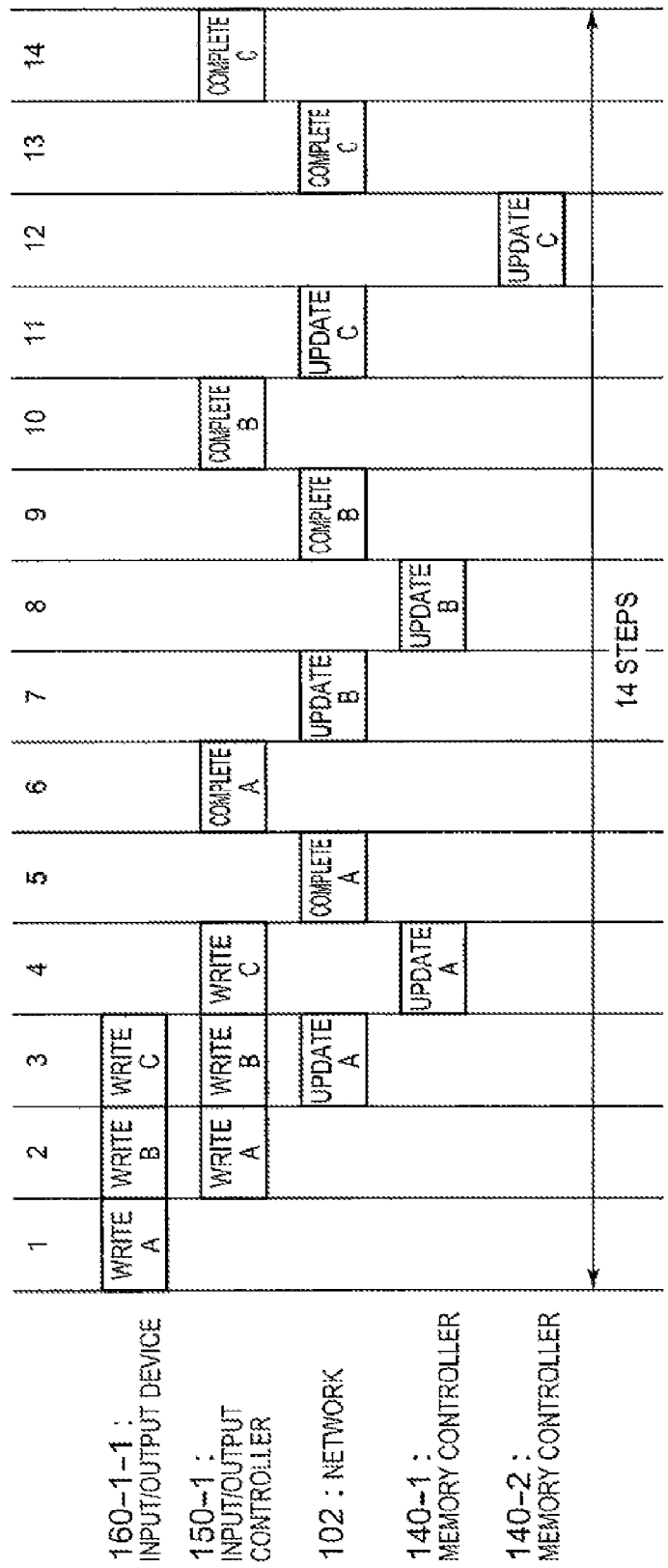
FIG. 2 is a timing chart showing the operation of Related Art 1.
Figure 3:
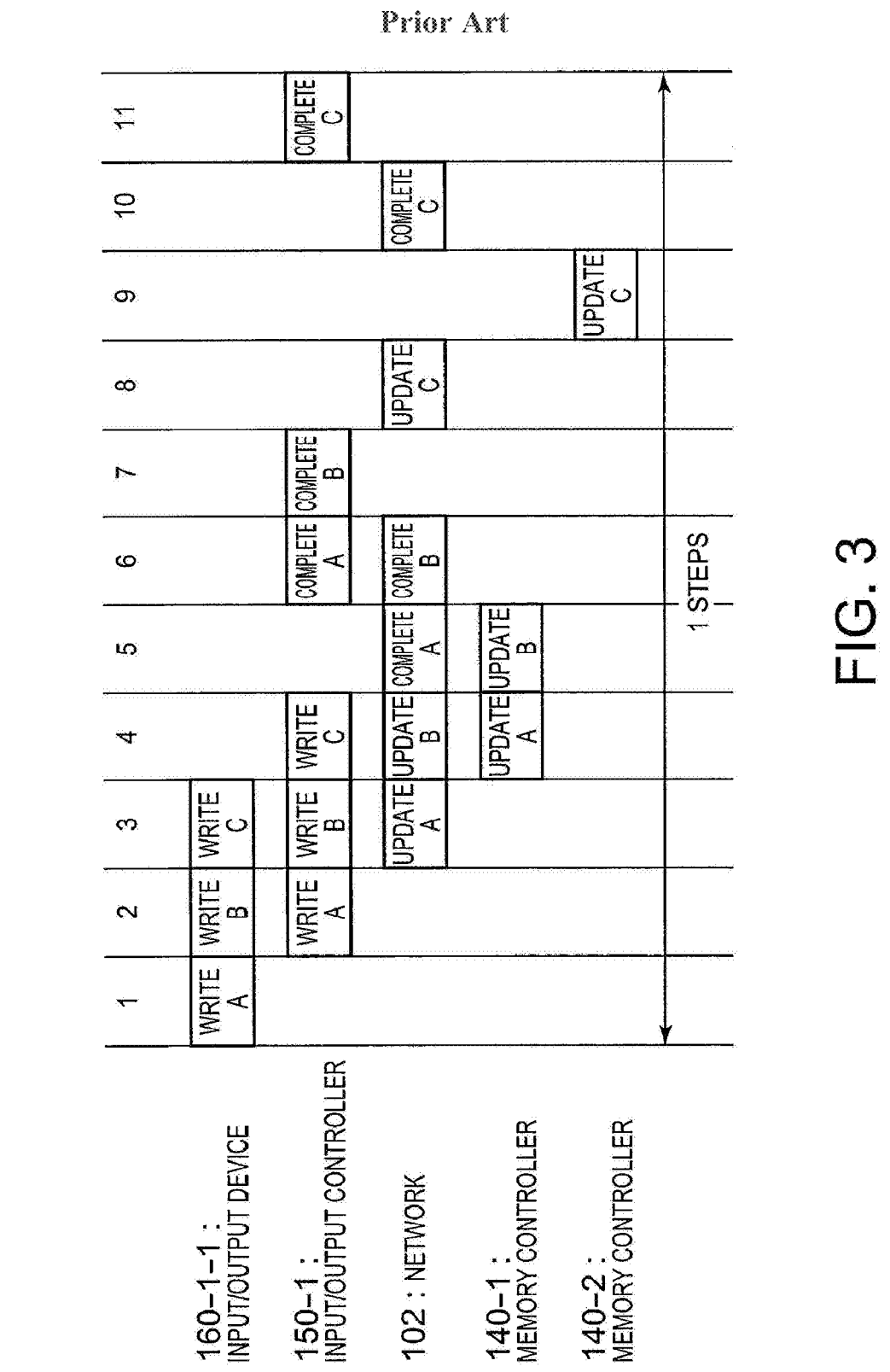
FIG. 3 is a timing chart showing the operation of Related Art 2.
Figure 4:
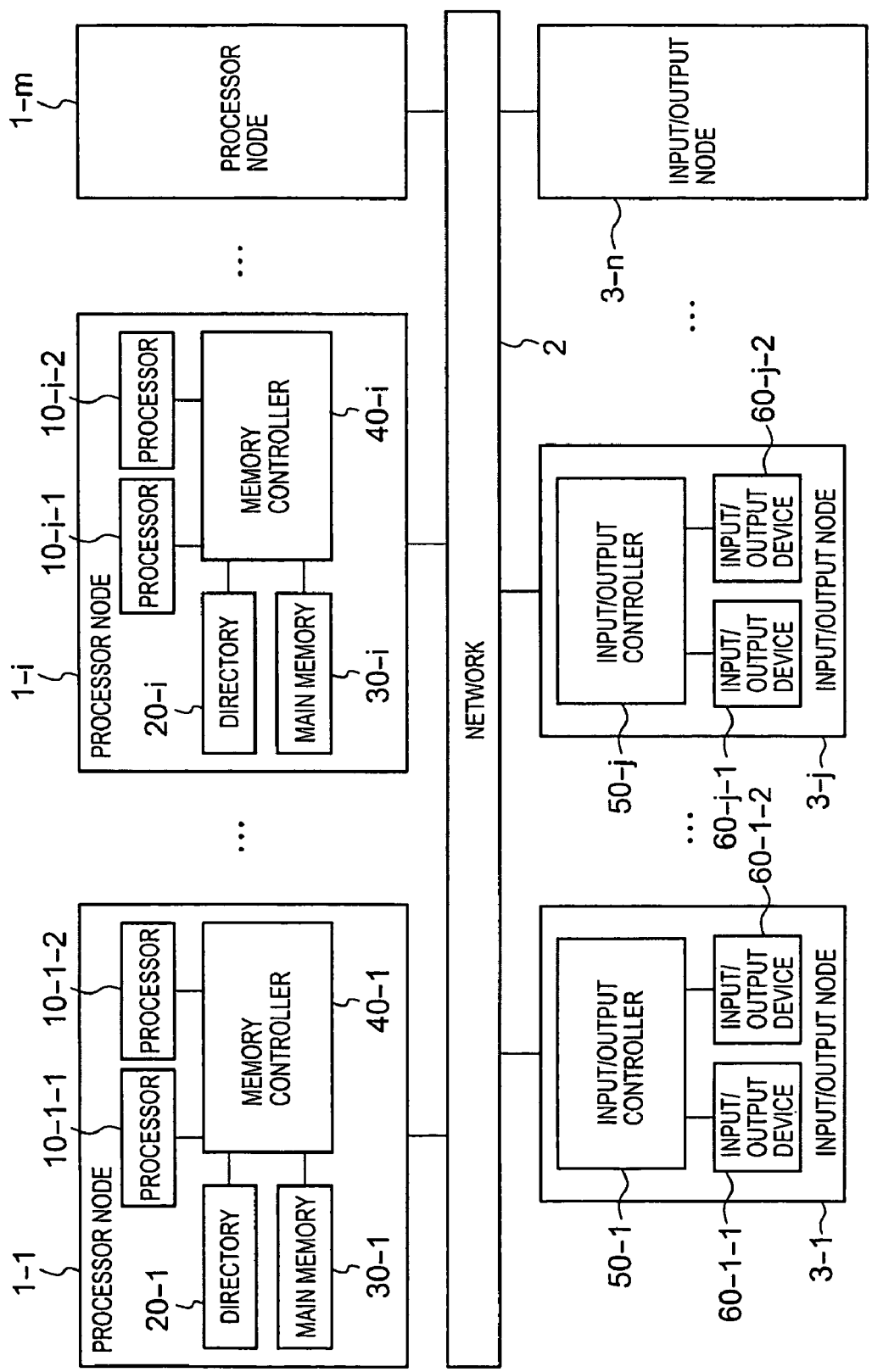
FIG. 4 is a diagram showing the structure of a multiprocessor system according to the present invention.

FIG. 4 shows the structure of the multiprocessor system. According to the present invention, the multiprocessor system includes a plurality of processor nodes (resource nodes) $1\text{-}1, \ldots, 1\text{-}i, \ldots,$ and $1\text{-}m$ (i and m are integers of 2 or more) and a plurality of input/output nodes (control nodes) $3\text{-}1, \ldots, 3\text{-}j, \ldots, 3\text{-}n$ (j and n are integers of 2 or more). The processor nodes $1\text{-}1$ to $1\text{-}m$ and the input/output nodes $3\text{-}1$ to $3\text{-}n$ are connected to a network 2 and each of them is operated in response to a clock externally supplied. Each processor node has the same structure. For example, the processor node $1\text{-}1$ includes a plurality of processors $10\text{-}1\text{-}1$ and $10\text{-}1\text{-}2$, a directory (resource information holding unit) $20\text{-}1$, and a main memory (resource holding unit) $30\text{-}1$, and a memory controller $40\text{-}1$. The memory controller $40\text{-}1$ is connected to the processors $10\text{-}1\text{-}1$ and $10\text{-}1\text{-}2$, the directory $20\text{-}1$, and the main memory $30\text{-}1$. The main memory $30\text{-}1$ stores a plurality of data. Each data includes a value indicating descriptions of the data. The respective input/output nodes have the same structure. For example, the input/output node $3\text{-}1$ includes an input/output controller (controller) $50\text{-}1$ and a plurality of input/output devices (control devices) $60\text{-}1\text{-}1$ and $60\text{-}1\text{-}2$. Each input/output device issues a message in accordance with a command externally supplied.

Each message includes a command type field indicating the type of command and an address field. For instance, when a message is a write message, the command type field indicates write. The network 2 delivers messages and ensures the order of messages transferred between two points. In the following description, an explanation may be made using reference numerals which are not shown in FIG. 4 for the sake of convenience. For example, although the processor node $1\text{-}2$ is not shown in FIG. 4, it includes a main memory $30\text{-}2$ and a memory controller $40\text{-}2$.

The directory $20\text{-}1$ holds information regarding control to ensure consistency of data stored in the main memory $30\text{-}1$ in units of a block of, e.g., 128 bytes. The same applies to main memories in the other processor nodes. Each information block includes state information regarding consistency control. The state information includes free-state information and write locked information. The free-state information indicates a state in which an access request is acceptable. The write-locked information indicates a state in which another access request is not acceptable.

Consistency control will now be briefly described. The multiprocessor system includes a plurality of processors. Each processor includes a cache to hold copies of data. Accordingly, a process of synchronizing a value in each data in a memory with values in copies of the data in a plurality of caches is needed. The process of synchronization includes, e.g., a process of invalidating copies. Synchronizing values of data with each other, i.e., ensuring consistency of data is called consistency control (consistency process). Information regarding data consistency control will be described in an embodiment which will be explained below.

According to the present invention, a series of messages between an input/output controller $50\text{-}j$ and a memory controller $40\text{-}i$ is designed so that write messages (requests) addressed to different homes can be successively issued. Reference numeral $50\text{-}j$ is used to represent at least one of the input/output controllers $50\text{-}1$ to $50\text{-}m$ (not shown) and reference numeral $40\text{-}i$ is also used to represent at least one of the memory controllers $40\text{-}1$ to $40\text{-}m$ (not shown).

It is assumed that a first input/output node of the input/output nodes $3\text{-}1$ to $3\text{-}n$ is the input/output node $3\text{-}1$ and the input/output devices $60\text{-}1\text{-}1$ and $60\text{-}1\text{-}2$ issue M write messages associated with first to M-th data (M is an integer of 2 or more), i.e., M data. In this instance, when the first input/ output controller of the input/output controllers, i.e., the input/output controller 50-1 in the input/output node 3-1 receives the M write messages, the input/output controller 50-1 starts M write transactions associated with the M data.

An I-th data (I=1, 2, . . . , or M) of the M data is homed at one of the processor nodes 1-1 to 1-*m*. It is assumed that the home processor node is the processor node 1-*i*. An I-th write message of the M write messages is a command to update a value in the I-th data of the plurality of data stored in a main memory 30-*i* of the processor node 1-*i* to a value specified in the I-th write message. The I-th write message will now be described as an example.

When receiving the I-th write message, the input/output controller 50-1 starts an I-th write transaction to output an I-th write-request message through the network 2 to the processor node 1-*i*. When receiving the I-th write-request message, the memory controller 40-*i* in the processor node 1-*i* operates as follows. The memory controller 40-*i* stores write-locked information, indicating a state in which another write-request message associated with the I-th data is not acceptable, in a directory 20-*i* of the processor node 1-*i* instead of free-state information associated with the I-th data. In addition, the memory controller 40-*i* outputs an I-th write-permission message through the network 2 to the input/output node 3-1 in response to the I-th write-request message.

Figure 5:
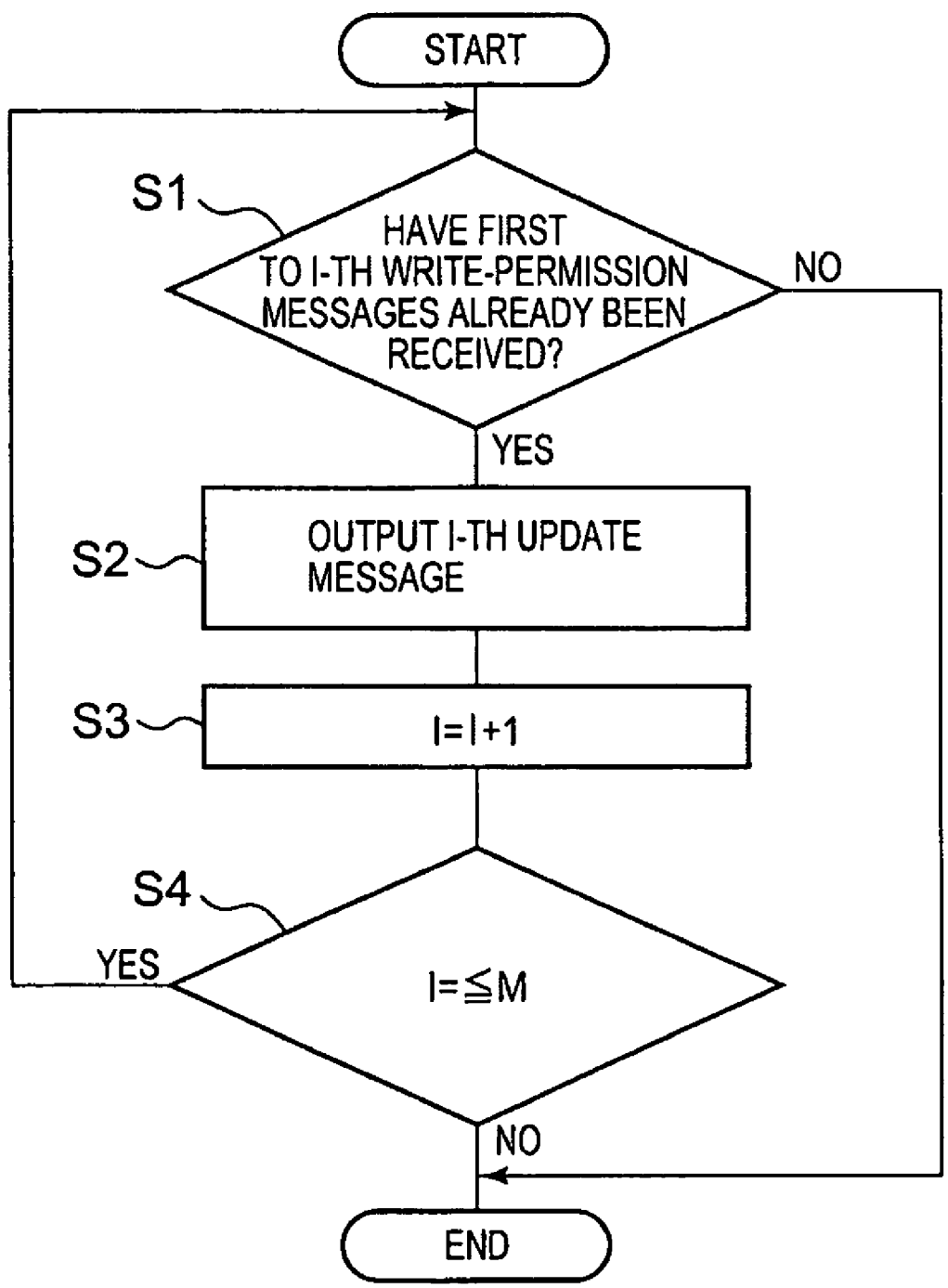
FIG. 5 is a flowchart showing the operation of the multiprocessor system according to the present invention when an input/output controller receives an I-th write-permission message.

In the input/output node 3-1, when receiving the I-th write-permission message, the input/output controller 50-1 executes an issuing process as shown in FIG. 5.

Referring to FIG. 5, the input/output controller 50-1 checks whether the controller has already received first to I-th write-permission messages, i.e., I write-permission messages (step S1). If the input/output controller 50-1 has not yet received the I write-permission messages (NO in step S1), the controller terminates the issuing process and waits for the next write-permission message. If the input/output controller 50-1 has already received the I write-permission messages (YES in step S1), the controller outputs an I-th update message, including the value specified in the I-th write message, through the network 2 to the processor node 1-*i* (step S2).

Subsequently, the input/output controller 50-1 executes a step such that I=I+1 (step S3). After that, the input/output controller 50-1 checks whether I is equal to or less than M (step S4). If I is equal to or less than M, i.e., the I-th write message has been received and the I-th write transaction has been started (YES in step S4), the process is returned to step S1. When I is larger than M, i.e., the I-th write message has not yet been received (NO in step S4), the process terminates.

As described above, the input/output controller 50-1 repeats steps S1 to S4. If the input/output controller 50-1 has already received all of write-permission messages corresponding to the preceding and current transactions, the controller issues an update message.

In the processor node 1-*i*, when receiving the I-th update message, the memory controller 40-*i* stores free-state information in the directory 20-*i* of the processor node 1-*i* instead of the write-locked information associated with the I-th data. In addition, the memory controller 40-*i* updates a value in the I-th data stored in the main memory 30-*i* of the processor node 1-*i* to the value specified in the I-th update message.

As described above, in the multiprocessor system according to the present invention, the input/output controller 50-*j* can successively process a plurality of write messages sent from the input/output devices 60-*j*-1 and 60-*j*-2 to different processor nodes 1-*i*.

Figure 6:
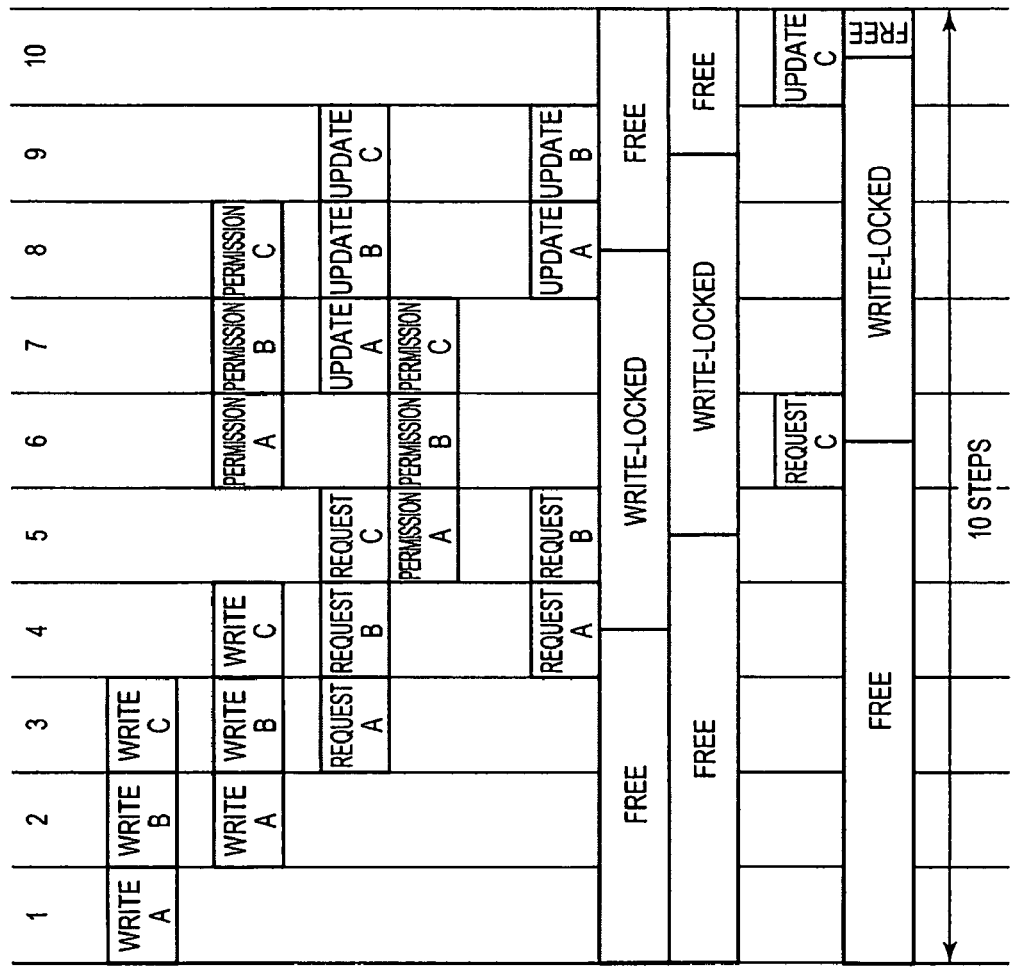
FIG. 6 is a timing chart illustrating the operation of the multiprocessor system according to the present invention when write messages are successively issued.

The operation in a case where order-constrained write messages are successively issued will now be described with reference to FIG. 6. FIG. 6 shows the operation in a case where the input/output device 60-1-1 issues write messages associated with M data (M=3), e.g., data A, B, and C in steps 1, 2, and 3, respectively. It is assumed that the data A and the data B are homed at the processor node 1-1 and the data C is homed at the processor node 1-2. One step corresponds to one clock.

In step 2, the input/output controller 50-1 receives a write A message, serving as a first write message. In this instance, the input/output controller 50-1 starts a write A transaction. In step 3, the input/output controller 50-1 outputs a write-request A message, serving as a first write-request message, through the network 2 to the home memory controller 40-1.

In step 4, when receiving the write-request A message from the input/output controller 50-1, the memory controller 40-1 updates state information, associated with the data A, held in the directory 20-1 from free-state information to write-locked information. Subsequently, in step 5, the memory controller 40-1 outputs a write-permission A message, serving as a first write-permission message, through the network 2 to the input/output controller 50-1.

In step 6, the input/output controller 50-1 receives the write-permission A message. At that time, since no preceding write messages exist, the input/output controller 50-1 outputs an update A message, serving as a first update message including a value specified in the first write message, through the network 2 to the memory controller 40-1 in step 7.

In step 8, the memory controller 40-1 receives the update A message from the input/output controller 50-1. In this instance, the memory controller 40-1 updates the state information, associated with the data A, held in the directory 20-1 from the write-locked information to the free-state information and further updates a value in the corresponding data in the main memory 30-1 to the value specified in the update A message. Therefore, the data A, serving as the write A message from the input/output controller 50-1, is stored.

In step 3, the input/output controller 50-1 also receives a write B message, serving as a second write message. In this instance, the input/output controller 50-1 starts a write B transaction. In step 4, the input/output controller 50-1 outputs a write-request B message, serving as a second write-request message, through the network 2 to the home memory controller 40-1.

When receiving the write-request B message from the input/output controller 50-1, the memory controller 40-1 updates state information, associated with the data B, held in the directory 20-1 from free-state information to write-locked information in step 5. In step 6, the memory controller 40-1 also outputs a write-permission B message, serving as a second write-permission message, through the network 2 to the input/output controller 50-1.

In step 7, the input/output controller 50-1 receives the write-permission B message. In this instance, the input/output controller 50-1 checks the progress of the preceding write A transaction. The input/output controller 50-1 has already received the write-permission A message, serving as the first write-permission message, in step 6 preceding step 7. In step 8, therefore, the input/output controller 50-1 outputs an update B message, serving as a second update message including a value specified in the second write message, through the network 2 to the memory controller 40-1.

In step 9, the memory controller 40-1 receives the update B message from the input/output controller 50-1. In this instance, the memory controller 40-1 updates the state information, associated with the data B, held in the directory 20-1 from the write-locked information to the free-state information and further updates a value in the corresponding data in the main memory 30-1 to the value specified in the update B message. Therefore, the data B, serving as the write B message from the input/output controller 50-1, is stored.

In step 4, the input/output controller 50-1 also receives a write C message, serving as a third write message. In this case, the input/output controller 50-1 starts a write C transaction. In step 5, the input/output controller 50-1 outputs a write-request C message, serving as a third write-request message, through the network 2 to the home memory controller 40-2 (not shown).

In step 6, when receiving the write-request C message from the input/output controller 50-1, the memory controller 40-2 updates state information, associated with the data C, held in a directory 20-2 from free-state information to write-locked information. In step 7, the memory controller 40-1 outputs a write-permission C message, serving as a third write-permission message, through the network 2 to the input/output controller 50-1.

In step 8, the input/output controller 50-1 receives the write-permission C message. In this instance, the input/output controller 50-1 checks the progresses of the preceding write A transaction and write B transaction. The input/output controller 50-1 has already received the write-permission A message in step 6 preceding step 8 and has also already received the write-permission B message in step 7 preceding step 8. In step 9, therefore, the input/output controller 50-1 outputs an update C message, serving as a third update message including a value specified in the third write message, through the network 2 to the memory controller 40-2.

In step 10, the memory controller 40-2 receives the update C message from the input/output controller 50-1. In this instance, the memory controller 40-2 updates the state information, associated with the data C, held in the directory 20-2 from the write-locked information to the free-state information and further updates a value in the corresponding data in the main memory 30-1 to the value specified in the update C message. Therefore, the data C, serving as the write C message from the input/output controller 50-1, is stored.

Figure 7:
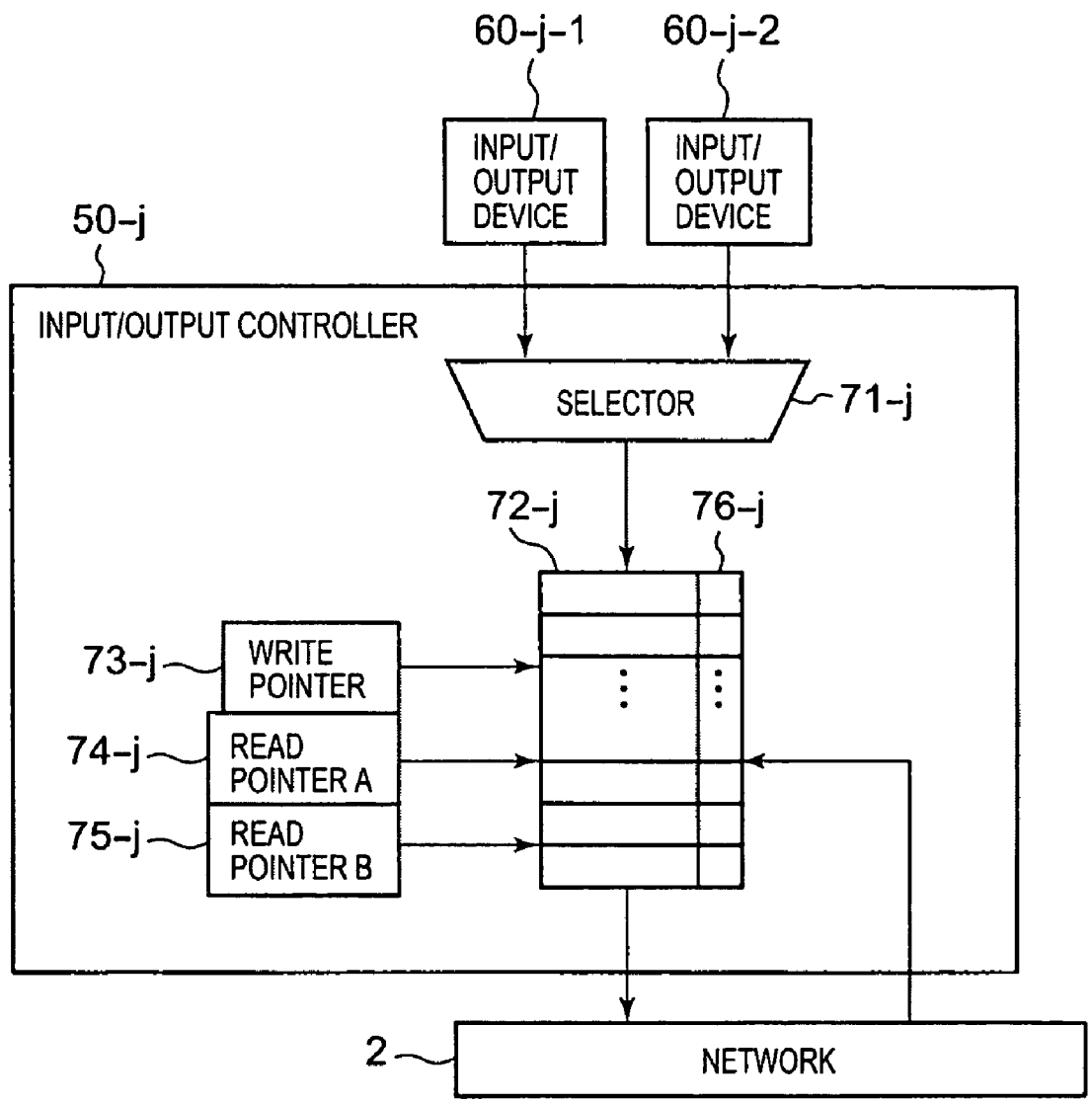
FIG. 7 is a diagram showing the structure of each input/output controller in the multiprocessor system according to the present invention.

The structure of the input/output controller 50-j will now be described as an example. Referring to FIG. 7, the input/output controller 50-j includes a selector 71-j, a message storage queue 72-j, a write pointer 73-j, a read pointer A 74-j, and a read pointer B 75-j. The input/output controller 50-j allows the selector 71-j to arranging messages from the plurality of input/output devices 60-j-1 and 60-j-2 and writes the messages into the message storage queue 72-j. Writing in the message storage queue 72-j is controlled using the write pointer 73-j. On the other hand, reading therefrom is controlled using the read pointer A 74-j and the read pointer B 75-j, i.e., the two read pointers. In addition, the input/output controller 50-j sets (stores) a permission flag 76-j into the message storage queue 72-j in accordance with a message sent from the network 2. Controlling the message storage queue 72-1 uses the permission flag 76-j. The same applies to, e.g., the input/output controller 50-1. In other words, the input/output controller 50-1 includes a selector 71-1, a message storage queue 72-1, a write pointer 73-1, a read pointer A 74-1, and a read pointer B 75-1 which are not shown.

FIGS. 8A to 8I show changes of values in the message storage queue 72-1, the write pointer 73-1, the read pointer A 74-1, the read pointer B 75-1, and the permission flag 76-1 included in the input/output controller 50-1 in the operation flow shown in FIG. 6.

Figure 8A:
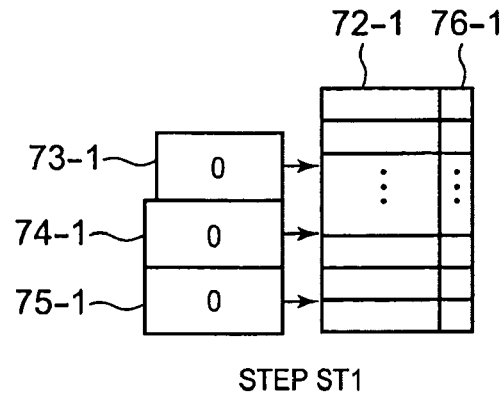
FIG. 8A is a diagram explaining an example of the operation of the input/output controller in the multiprocessor system according to the present invention.
Figure 8B:
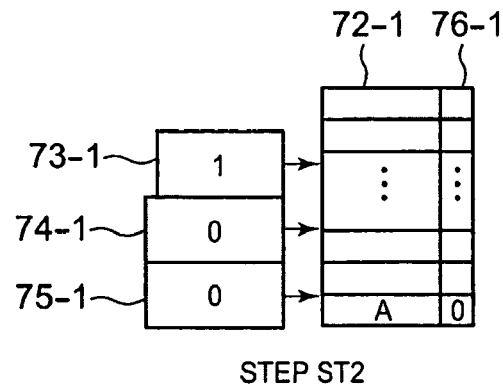
FIG. 8B is a diagram explaining the example of the operation of the input/output controller in the multiprocessor system according to the present invention.

As shown in FIG. 8A, in step ST1, serving as an initial state, the write pointer 73-1, the read pointer A 74-1, and the read pointer B 75-1 each indicate Referring to FIG. 8B, in step ST2, when receiving the write A message from the input/output device 60-1-1, the input/output controller 50-1 writes the write A message into an entry "0" in the message storage queue 72-1 indicated by the write pointer 73-1. In addition, the input/output controller 50-1 sets a value in an entry "0" in the permission flag 76-j to "0" and updates the value indicated by the write pointer 73-1 to "1".

Figure 8C:
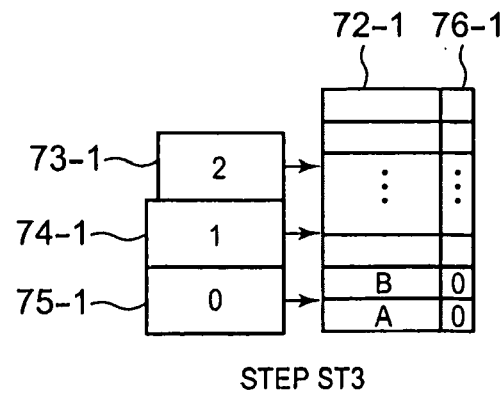
FIG. 8C is a diagram explaining the example of the operation of the input/output controller in the multiprocessor system according to the present invention.

As shown in FIG. 8C, in step ST3, when receiving the write B message from the input/output device 60-1-1, the input/output controller 50-1 writes the write B message into an entry "1" in the message storage queue 72-1 indicated by the write pointer 73-1. In addition, the input/output controller 50-1 sets a value in an entry "1" in the permission flag 76-j to "0" and updates the value indicated by the write pointer 73-1 to "2".

In this instance, the valid entries exist in the message storage queue 72-1 in step ST2. Accordingly, as shown in FIG. 8C, the input/output controller 50-1 outputs the write-request A message to the network 2 on the basis of information regarding the entry "0" indicated by the read pointer A 74-1 and then updates the value indicated by the read pointer A 74-1 to "1".

Figure 8D:
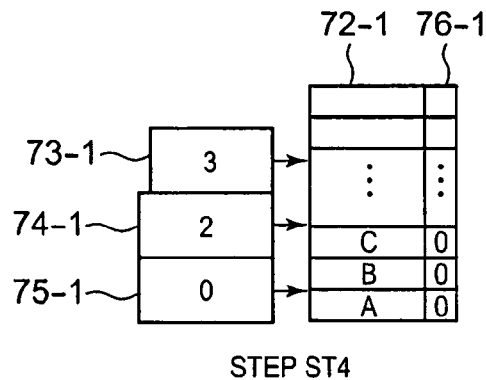
FIG. 8D is a diagram explaining the example of the operation of the input/output controller in the multiprocessor system according to the present invention.

In step ST4, the input/output controller 50-1 receives the write C message from the input/output device 60-1-1. In this instance, as shown in FIG. 8D, the input/output controller 50-1 writes the write C message into an entry "2" in the message storage queue 72-1 indicated by the write pointer 73-1. The input/output controller 50-1 also sets a value in the entry "2" in the permission flag 76-1 to "0" and updates the value indicated by the write pointer 73-1 to "3".

In step ST3, the valid entries exist in the message storage queue 72-1. Accordingly, as shown in FIG. 8D, the input/output controller 50-1 outputs the write-request B message to the network 2 on the basis of information regarding the entry "1" indicated by the read pointer A 74-1 and then updates the value indicated by the read pointer A 74-1 from "1" to "2".

Figure 8E:
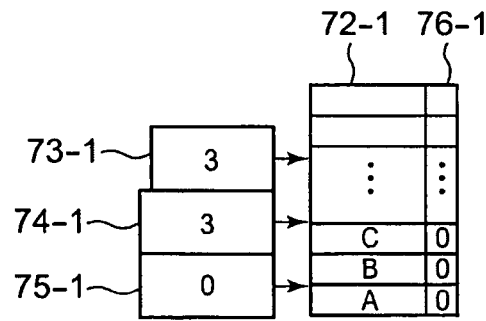
FIG. 8E is a diagram explaining the example of the operation of the input/output controller in the multiprocessor system according to the present invention.

In step ST4, the valid entries exist in the message storage queue 72-1. Accordingly, as shown in FIG. 8E, the input/output controller 50-1 outputs the write-request C message to the network 2 on the basis of information regarding the entry "2" indicated by the read pointer A 74-1 and then updates the value indicated by the read pointer A 74-1 from "2" to "3" in step ST5.

Figure 8F:
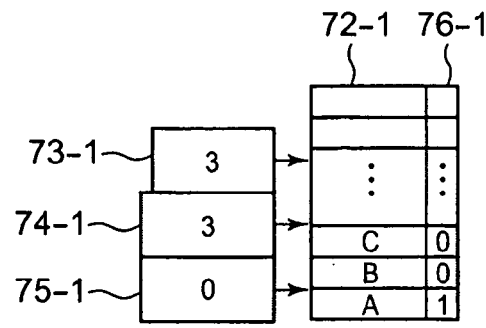
FIG. 8F is a diagram explaining the example of the operation of the input/output controller in the multiprocessor system according to the present invention.

As shown in FIG. 8F, when receiving the write-permission A message, the input/output controller 50-1 updates the value in the entry "0", corresponding to the data A, in the permission flag 76-j from "0" to "1". In addition, the input/output controller 50-1 checks whether the value representing the entry indicated by the read pointer B 75-1 matches the entry which stores the data A corresponding to the received write-permission message. Matching therebetween means that no preceding write transactions exist, alternatively, any write-permission message has already been received, the corresponding update message has already been issued, and the write transaction has been completed. In this case, since the indicated value matches the entry "0", the input/output controller 50-1 executes the process of issuing an update message and waits for the arrival of the next write-permission message.

In step ST6, the input/output controller 50-1 reads out the value in the entry "0" in the message storage queue 72-1 indicated by the read pointer B 75-1. In step ST7, the input/output controller 50-1 outputs the update A message to the network 2. In this case, as shown in FIG. 8G, the input/output controller 50-1 updates the value in the read pointer B 75-1 from "0" to "1".

Subsequently, the input/output controller 50-1 compares the value in the read pointer B 75-1 with that in the write pointer 73-1. In the comparison, when the value in the read pointer B 75-1 is smaller than the other one, this means that an incomplete write transaction exists. In this case, the input/output controller 50-1 checks whether any write transaction is not completed but a write-permission message corresponding thereto has been received. Since the value "1" in the read pointer B 75-1 is smaller than the value "3" in the write pointer 73-1, the value in the entry "1" in the permission flag 76-1 indicated by the read pointer B 75-1 is read. The value in the entry "1" in the permission flag 76-1 is "0", which means that the corresponding write-permission message has not yet been received. Accordingly, the input/output controller 50-1 does not execute the process of issuing an update message corresponding to the entry "1" and waits for the arrival of the next write-permission message.

Figure 8G:
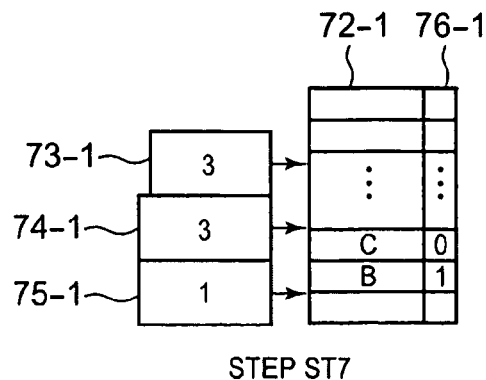
FIG. 8G is a diagram explaining the example of the operation of the input/output controller in the multiprocessor system according to the present invention.

As shown in FIG. 8G, in step ST7, when receiving the permission B message, the input/output controller 50-1 updates the value in the entry "1", corresponding to the data B, in the permission flag 76-1 from "0" to "1". In addition, the input/output controller 50-1 checks whether the value representing the entry indicated by the read pointer B 75-1 matches the entry which stores the data B corresponding to the received write-permission message. In this case, since the indicated value matches the entry "1", the input/output controller 50-1 executes the process of issuing an update message.

In step ST7, the input/output controller 50-1 reads out the value in the entry "1", indicated by the read pointer B 75-1, in the message storage queue 72-1. In step ST8, the input/output controller 50-1 outputs the write B message to the network 2. In this case, as shown in FIG. 8H, the input/output controller 50-1 updates the value in the read pointer B 75-1 from "1" to "2".

Subsequently, the input/output controller 50-1 compares the value "2" in the read pointer B 75-1 with the value "3" in the write pointer 73-1. The comparison shows that the value in the read pointer B 75-1 is smaller than the other one. Accordingly, the input/output controller 50-1 reads the value in the entry "2", indicated by the read pointer B 75-1, in the permission flag 76-1. The value in the entry "2" is "0", which means that the corresponding write-permission message has not yet been received. Therefore, the input/output controller 50-1 does not execute the process of issuing an update message associated with the entry "2" and waits for the arrival of the next write-permission message.

Figure 8H:
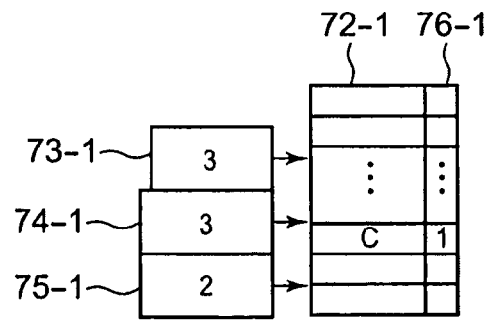
FIG. 8H is a diagram explaining the example of the operation of the input/output controller in the multiprocessor system according to the present invention.

As shown in FIG. 8H, in step ST8, when receiving the write-permission C message, the input/output controller 50-1 updates the value in the entry "2", corresponding to the data C, in the permission flag 76-1 from "0" to "1". In addition, the input/output controller 50-1 checks whether the value representing the entry indicated by the read pointer B 75-1 matches the entry which stores the data C corresponding to the received write-permission message. In this case, since the indicated value matches the entry "2", the input/output controller 50-1 executes the process of issuing an update message.

Figure 8I:
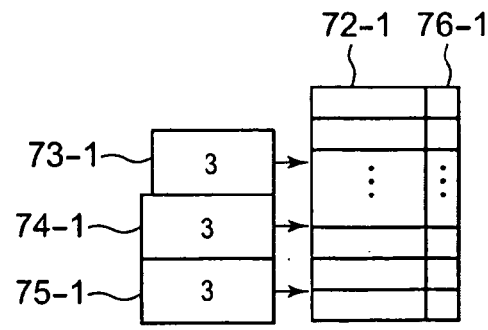
FIG. 8I is a diagram explaining the example of the operation of the input/output controller in the multiprocessor system according to the present invention.

In step ST8, the input/output controller 50-1 reads out the value in the entry "2", indicated by the read pointer B 75-1, in the message storage queue 72-1. In step ST9, the input/output controller 50-1 outputs the write C message to the network 2. In this case, as shown in FIG. 8I, the input/output controller 50-1 updates the value in the read pointer B 75-1 from "2" to "3".

Subsequently, the input/output controller 50-1 compares the value "3" in the read pointer B 75-1 with the value "3" in the write pointer 73-1. The comparison shows that the values match each other. This means that no incomplete write transactions exist. Accordingly, the input/output controller 50-1 terminates the process.

With the above-described operation, the order of write transactions associated with the same home and the order of write transactions associated with different homes can be ensured.

The order of the write B transaction and the write A transaction is ensured for the following reason. Upon issuing of the update B message, the write-permission A message has already been received. It is ensured that state information associated with the data A in the home directory 20-1 has been changed to write-locked information. In the write-locked state, the update A message is received, the value in the data A is updated, the state information is changed to free-state information, and after that, any processor or input/output device can read only the updated value in the data A. Therefore, only the updated value in the data A can be read at the time when the updated value in the data B can be read. Accordingly, the order of transactions is ensured.

The order of the write C transaction and the write B transaction is ensured for the same reason as the above-described one. Upon issuing of the update C message, the write-permission B message has already been received. It is ensured that state information associated with the data B in the home directory 20-1 has been changed to write-locked information. In the write-locked state, the update B message is received, the value in the data B is updated, the state information is changed to free-state information, and after that, any processor or input/output device can read only the updated value in the data B. Therefore, only the updated value in the data B can be read at the time when the updated value in the data C can be read. Accordingly, the order of transactions is ensured.

The above-described process includes 10 steps. As compared to Related Arts 1 and 2, the performance of processing write messages sent from input/output devices can be improved.

Figure 9:
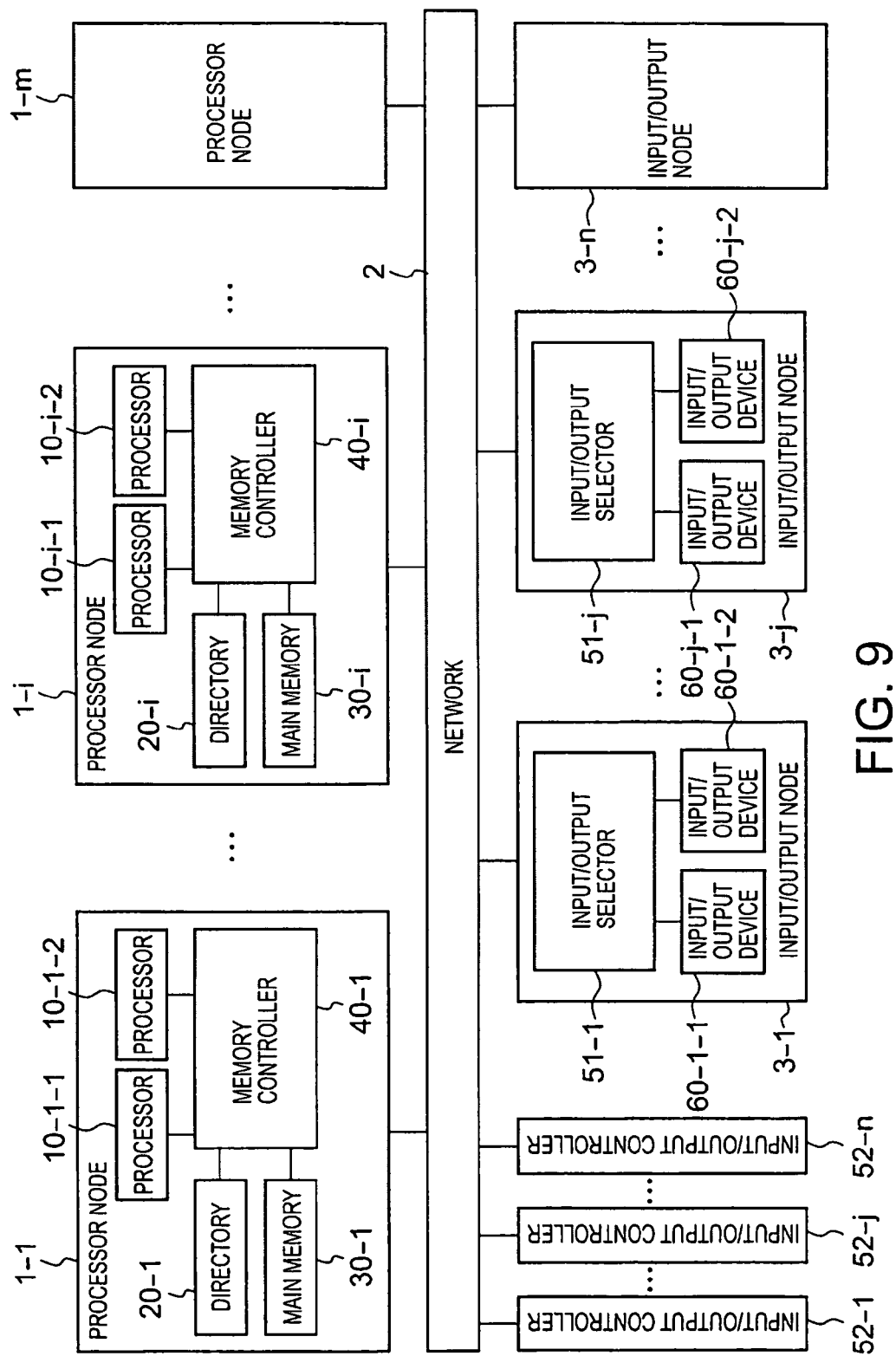
FIG. 9 is a diagram showing another structure of the multiprocessor system according to the present invention.

In the above example, each input/output controller is provided in one input/output node. Each input/output controller may be arranged outside the input/output node and be directly connected to the network 2. FIG. 9 shows an example of this arrangement. Input/output controllers 52-1, . . . , 52-*j*, . . . , and 52-*n*, arranged outside the input/output nodes 3-1, . . . 3-*j*, . . . , and 3-*n*, are connected to the network 2. The other arrangements are the same as those in FIG. 4. Preferably, the input/output node 3-*j* includes an input/output selector 51-*j* corresponding to the input/output selector 71-*j* explained in FIG. 7. The input/output selector 51-*j* arranges messages output from the input/output devices 60-*j*-1 and 60-*j*-2 and sequentially outputs the messages to the network 2. The input/output controller 52-*j* may be designed to perform the same process as that by the input/output controller 50-*j* described in FIG. 4 in response to the messages output to the network 2. The same applies to all of input/output controllers and input/output nodes shown in FIG. 9.

The input/output controller 52-*j* shown in FIG. 9 may not be connected to the network 2. An input/output controller 52-*i* (not shown) may be included in the processor node 1-*i*. In this case, preferably, the input/output node 3-*j* includes the above-described input/output selector 51-*j*. The same applies to the other controllers.

In the structures shown in FIGS. 4 and 9, the number m may be equal to the number n. The processor node 1-*i* and the corresponding input/output node 3-*j* may be combined into one node (not shown). In this case, preferably, the node is connected to the network 2 and includes the above-described input/output selector 51-*j*. It is needless to say that the same applies to the other processor nodes and input/output nodes.

As is obvious from the above description, in the multiprocessor system according to the present invention, each input/output controller 50-*j* can successively process a plurality of write messages sent from the input/output devices 60-*j*-1 and 60-*j*-2 to different processor nodes 1-*i*. In addition, since the input/output controller 50-*j* successively processes a plurality of write messages, the time required to process the write messages through the input/output controller 50-*j* can be reduced as compared with those in the conventional systems. As described above, reference numerals 50-*j*, 1-*i*, 60-*j*-1, and 60-*j*-2 denote typical examples.

An interaction between the input/output controller 50-*j* and the memory controller 40-*i* will now be described in more detail below.

First Embodiment

As described above, the directory 20-*i* holds information regarding control to ensure consistency of data stored in the main memory 30-*i* in units of a block of, e.g., 128 bytes. Information regarding data consistency control includes state information (state information regarding data consistency control) related to each block in the main memory 30-*i* and map information.

As described above, the state information (state information regarding data consistency) in each block includes free-state information and write-locked information. The free-state information indicates a state in which another access request is acceptable. Write-locked information indicates a state in which another access request is not acceptable.

The free-state information includes, e.g., Uncached, Clean, and Dirty (hereinafter, also abbreviated to U, C, and D) information, i.e., three types of information.

The Uncached information indicates a state in which none of the processor nodes 1-1 to 1-*m* caches data. The Clean information indicates a state in which at least one of the processor nodes 1-1 to 1-*m* caches data. The Dirty information indicates a state in which any one of the processor nodes 1-1 to 1-*m* caches data and the latest data exists in the one processor node.

The state information (state information regarding data consistency control) in each block includes request-locked information as state information indicating a state in which another access request is not acceptable. The request-locked information indicates a state in which a requested message alone is acceptable.

According to the present invention, the write-locked information may be identical to or different from the request-locked information. In the following description, an explanation will be made with respect to a case where the write-locked information (hereinafter, also abbreviated to W) is different from the request-locked information (hereinbelow, also abbreviated to R).

The map information indicates whether each processor node 1-*i* caches data related to the corresponding block. The map information will now be described using bits whose number corresponds to the number of processor nodes. In the structure of FIG. 4 as an example, m is set to 3. In other words, the processor nodes 1-1, 1-2, and 1-3 exist. The map information is represented with three bits.

For example, "000" represents that none of the processor nodes 1-1, 1-2, and 1-3 caches data. "001" indicates that the processor node 1-1 caches data.

"010" represents that the processor node 1-2 caches data. "100" indicates that the processor node 1-3 caches data. Similarly, "110" represents that the processor nodes 1-2 and 1-3 cache data.

Figure 10:
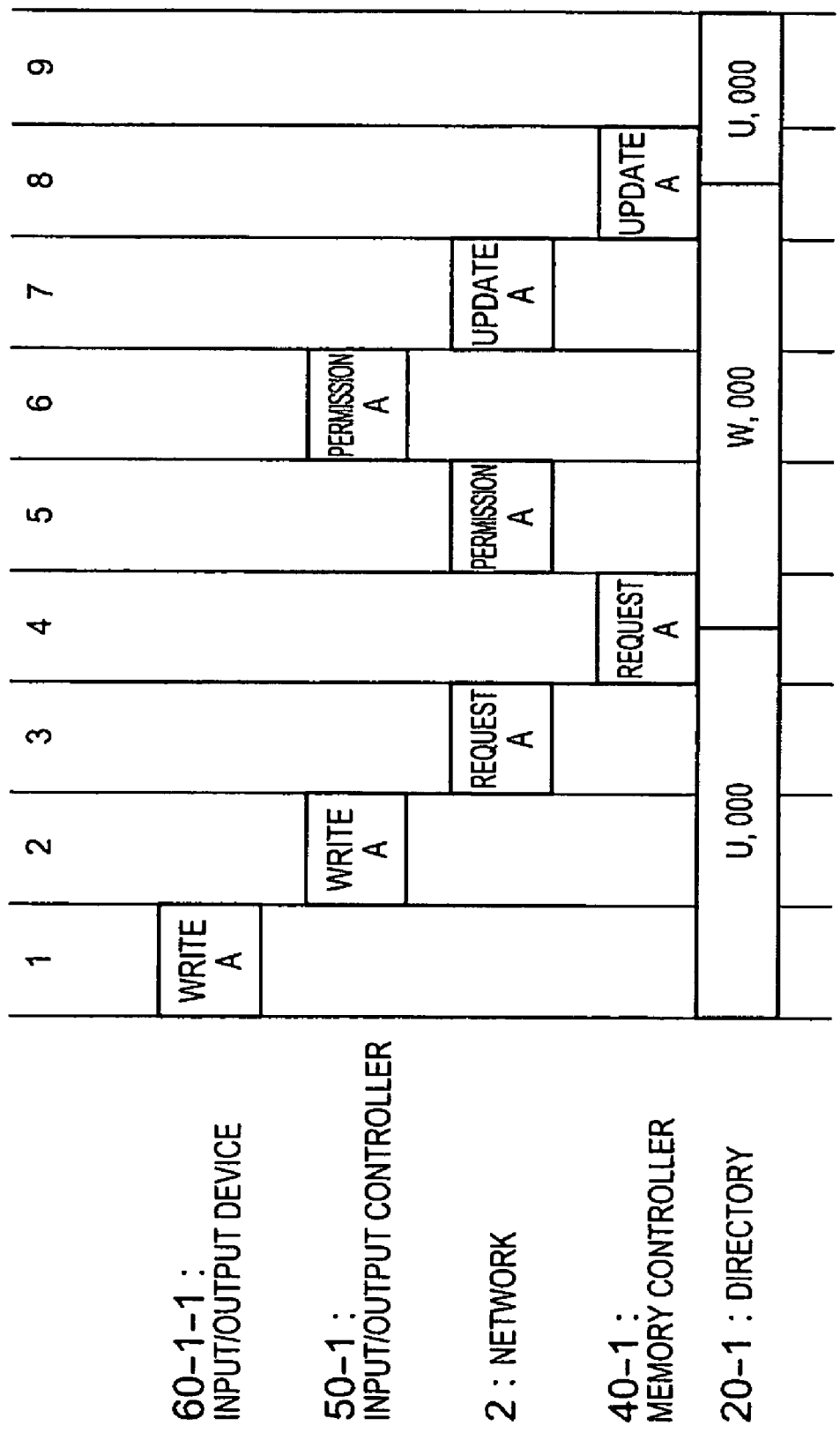
FIG. 10 is a timing chart showing the operation of a multiprocessor system according to a first embodiment of the present invention when the state of a directory is Uncached.

An example of the first operation of a multiprocessor system according to the first embodiment of the present invention will now be described with reference to FIG. 10. The first operation is performed in a case where when the memory controller 40-1 receives a write-request A message, state information in the corresponding block in the directory 20-1 is Uncached information. FIG. 10 shows the operation in a case where the input/output device 60-1-1 issues a write message associated with data A in step 1. In this case, the data A is homed at the processor node 1-1. One step corresponds to one clock.

In step 2, the input/output controller 50-1 receives a write A message. In this instance, in step 3, the input/output controller 50-1 outputs a write-request A message to the home memory controller 40-1 through the network 2.

In step 4, the memory controller 40-1 receives the write-request A message from the input/output controller 50-1 and updates state information, associated with the data A, held in the directory 20-1 from free-state information to write-locked information. In other words, a value in the corresponding block in the directory 20-1 is updated from "U, 000" to "W, 000". In this instance, "U, 000" represents that the state information is U (Unchached) and the map information is "000". In step 5, the memory controller 40-1 outputs a write-permission A message to the input/output controller 50-1 through the network 2.

In step 6, the input/output controller 50-1 receives the write-permission A message. In step 7, the input/output controller 50-1 outputs an update A message to the memory controller 40-1 through the network 2.

In step 8, the memory controller 40-1 receives the update A message from the input/output controller 50-1 and updates a value in the corresponding data in the main memory 30-1 to a value specified in the update A message. Then, the memory controller 40-1 updates the state information associated with the data A held in the directory 20-1 from write-locked information to free-state information. In other words, a value in the corresponding block in the directory 20-1 is updated from "W, 000" to "U, 000".

Figure 11:
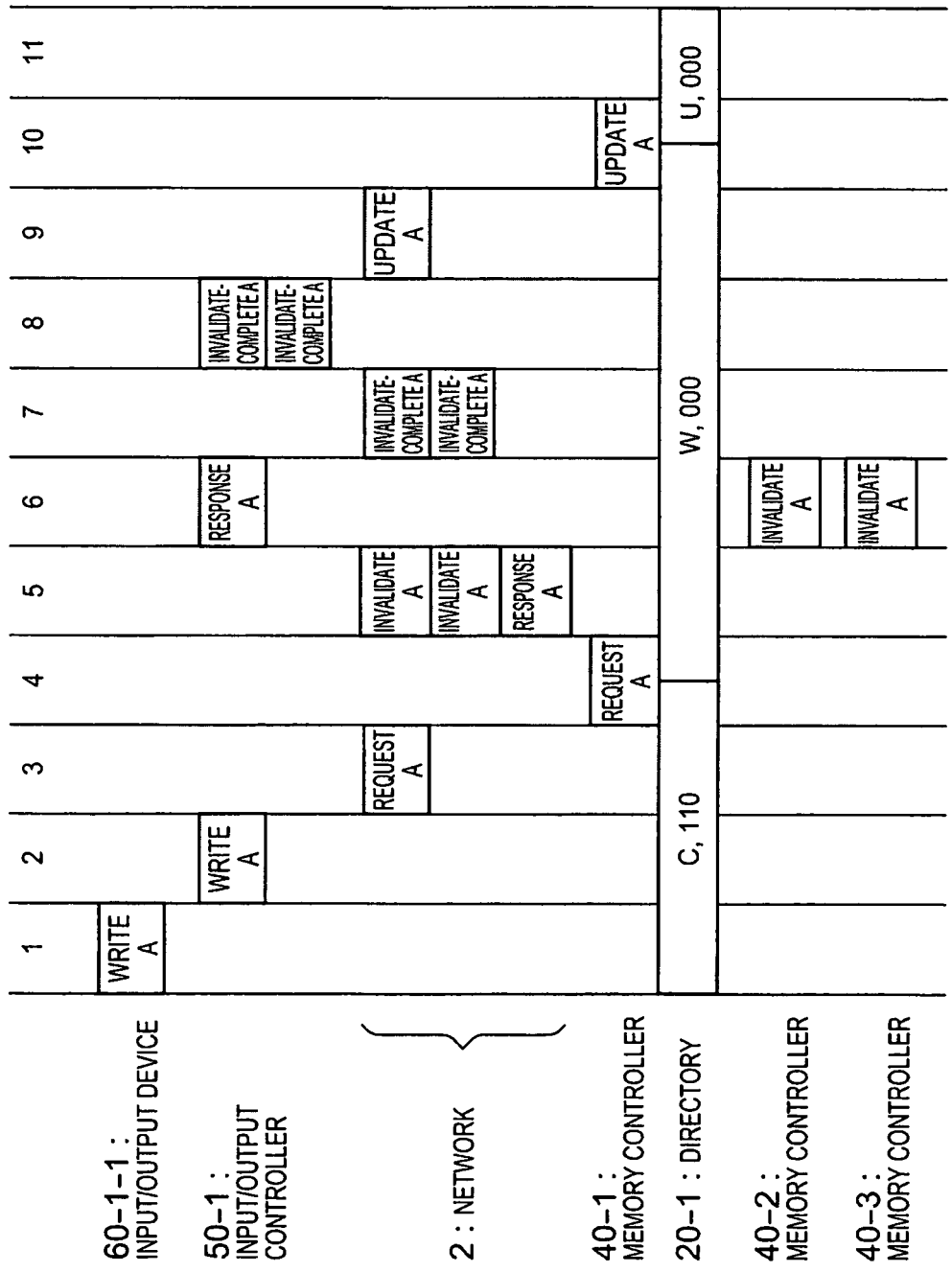
FIG. 11 is a timing chart showing the operation of the multiprocessor system according to the first embodiment of the present invention when the state of the directory is Clean.

An example of the second operation of the multiprocessor system according to the first embodiment of the present invention will now be described with reference to FIG. 11. The second operation is performed in a case where when the memory controller 40-1 receives the write-request A message, state information in the corresponding block in the directory 20-1 is Clean information and the processor nodes 1-2 and 1-3 cache data. FIG. 11 shows the operation in a case where the input/output device 60-1-1 issues a write message associated with data A in step 1. In this case, the data A is homed at the processor node 1-1. One step corresponds to one clock.

In step 2, the input/output controller 50-1 receives the write A message. In step 3, the input/output controller 50-1 outputs a write-request A message to the home memory controller 40-1 through the network 2.

In step 4, the memory controller 40-1 receives the write-request A message from the input/output controller 50-1 and updates state information, associated with the data A, held in the directory 20-1 from free-state information to write-locked information. In other words, a value in the corresponding block in the directory 20-1 is updated from "C, 110" to "W, 000". In this instance, "C, 110" represents that the state information is C (Clean) and the map information is "110". In step 5, the memory controller 40-1 outputs a response A message to the input/output controller 50-1 through the network 2 and outputs an invalidate A message to each of the memory controllers 40-2 and 40-3. In this case, information regarding the number of caching processor nodes (2 in this example) is added to the response A message.

In step 6, the input/output controller 50-1 receives the response A message. In addition, in step 6, the memory controllers 40-2 and 40-3 each receives the invalidate A message to invalidate the data A cached in the processor nodes 1-2 and 1-3. Subsequently, in step 7, each of the memory controllers 40-2 and 40-3 outputs an invalidate-complete A message to the input/output controller 50-1 through the network 2.

In step 8, when receiving the invalidate-complete A messages including the number added to the response A message, the input/output controller 50-1 interprets (recognizes) that the write-permission A message is received. In step 9, the input/output controller 50-1 outputs an update A message to the memory controller 40-1 through the network 2.

In step 10, the memory controller 40-1 receives the update A message from the input/output controller 50-1 and updates a value in the corresponding data in the main memory 30-1 to a value specified in the update A message. Subsequently, the memory controller 40-1 updates the state information associated with the data A held in the directory 20-1 from the write-locked information to the free-state information. In other words, a value in the corresponding block in the directory 20-1 is updated from "W, 000" to "U, 000".

Figure 12:
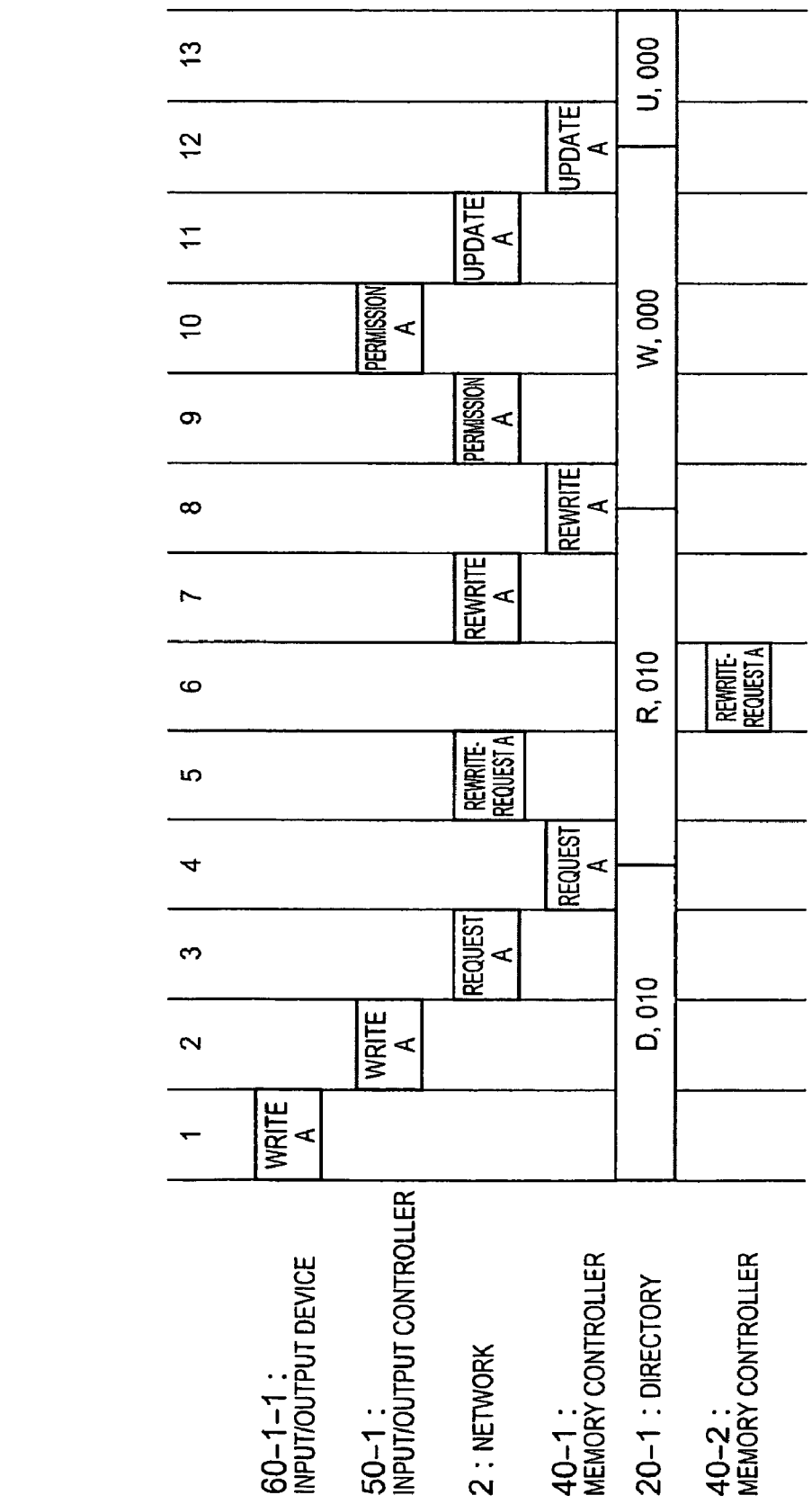
FIG. 12 is a timing chart showing the operation of the multiprocessor system according to the first embodiment of the present invention when the state of the directory is Dirty.

The third operation of the multiprocessor system according to the first embodiment of the present invention will now be described with reference to FIG. 12. The third operation is performed in a case where when the memory controller 40-1 receives a write-request A message, state information in the corresponding block in the directory 20-1 is Dirty information and the processor node 1-2 caches data. FIG. 12 shows the operation in a case where the input/output device 60-1-1 issues a write message associated with data A in step 1. In this case, the data A is homed at the processor node 1-1. One step corresponds to one clock.

In step 2, the input/output controller 50-1 receives the write A message. In step 3, the input/output controller 50-1 outputs a write-request A message to the home memory controller 40-1 through the network 2.

In step 4, the memory controller 40-1 receives the write-request A message from the input/output controller 50-1 and updates state information, associated with the data A, held in the directory 20-1 from free-state information to request-locked information. In other words, a value in the corresponding block in the directory 20-1 is updated from "D, 010" to "R, 010". In this instance, "R, 010" represents that the state information is R (Request Rock) and the map information is "010". In step 5, the memory controller 40-1 outputs a rewrite-request A message to the input/output controller 50-1 through the network 2. The value may be updated to "W, 000", i.e., write-locked information instead of "R, 010", i.e., request-locked information.

In step 6, the memory controller 40-2 receives the rewrite-request A message from the memory controller 40-1 to rewrite the data A cached in the processor node 1-2. Subsequently, in step 7, the memory controller 40-2 outputs a rewrite A message to the memory controller 40-1 through the network 2.

In step 8, the memory controller 40-1 receives the rewrite A message, serving as a message requested on the basis of the request-locked information, from the memory controller 40-2 and updates state information, associated with the data A, held in the directory 20-1 from request-locked information to write-locked information. In other words, the value in the corresponding block in the directory 20-1 is updated from "R, 010" to "W, 000". In step 9, the memory controller 40-1 outputs a write-permission A message to the input/output controller 50-1 through the network 2.

In step 10, the input/output controller 50-1 receives the write-permission A message. In step 11, the input/output controller 50-1 outputs an update A message to the memory controller 40-1 through the network 2.

In step 11, the memory controller 40-1 receives the update A message from the input/output controller 50-1 and updates a value in the corresponding data in the main memory 30-1 to a value specified in the update A message. Subsequently, the memory controller 40-1 updates the state information, associated with the data A, held in the directory 20-1 from the write-locked information to free-state information. In other words, the value in the corresponding block in the directory 20-1 is updated from "W, 000" to "U, 000".

Figure 13:
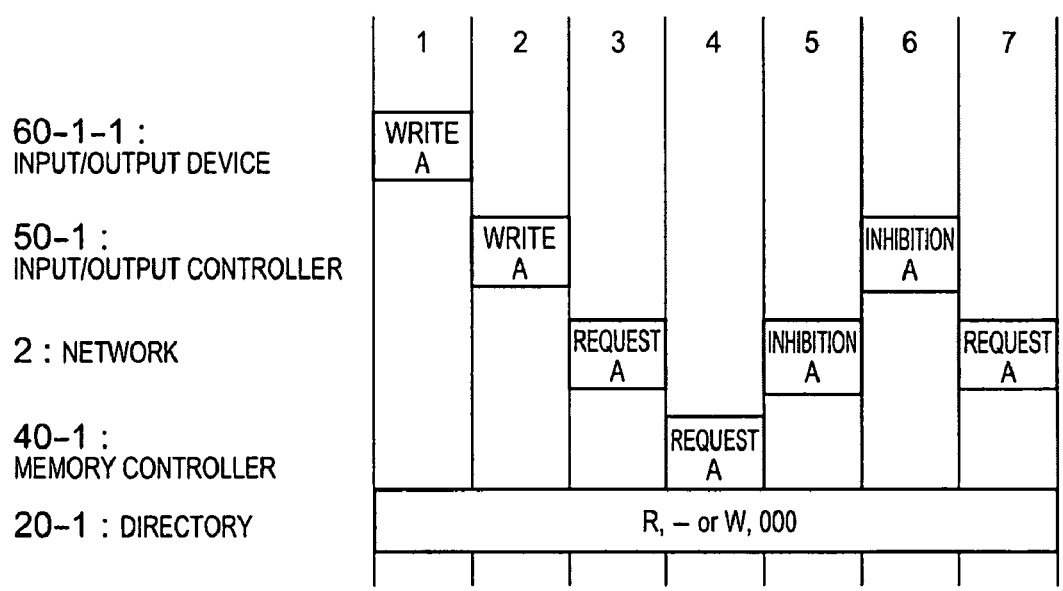
FIG. 13 is a timing chart showing the operation of the multiprocessor system according to the first embodiment of the present invention when the state of the directory is request-locked or write-locked.

An example of the third operation of the multiprocessor system according to the first embodiment of the present invention will now be described with reference to FIG. 13. The third operation is performed in a case where when the memory controller 40-1 receives a write-request A message, state information in the corresponding block in the directory 20-1 is request-locked information "R" or write-locked information "W". FIG. 13 shows the operation in which the input/output device 60-1-1 issues a write message associated with data A in step 1. In this case, the data A is homed at the processor node 1-1. One step corresponds to one clock.

In step 2, the input/output controller 50-1 receives the write A message. In step 3, the input/output controller 50-1 outputs a write-request A message to the home memory controller 40-1 through the network 2.

In step 4, the memory controller 40-1 receives the write-request A message from the input/output controller 50-1. In this instance, state information, associated with the data A, held in the directory 20-1 is request-locked information "R" or write-locked information "W". In step 5, therefore, the memory controller 40-1 outputs an inhibition A message to the input/output controller 50-1 through the network 2.

In step 6, the input/output controller 50-1 receives the inhibition A message. In step 7, the input/output controller 50-1 again outputs the write-request A message to the memory controller 40-1 through the network 2. Since step 7 and following steps are the same as those in the operations explained with reference to FIGS. 10 to 12, the description thereof is omitted.

With the above-described operation, bits whose number corresponds to that of input/output nodes may not be added to map information in each directory. In addition, an access request, sent from a processor, received at a home node may not be transferred to the input/output controller 50-*j*. Advantageously, therefore, the structure of each memory controller and that of each input/output controller is not complicated.

SECOND EMBODIMENT

Figure 14:
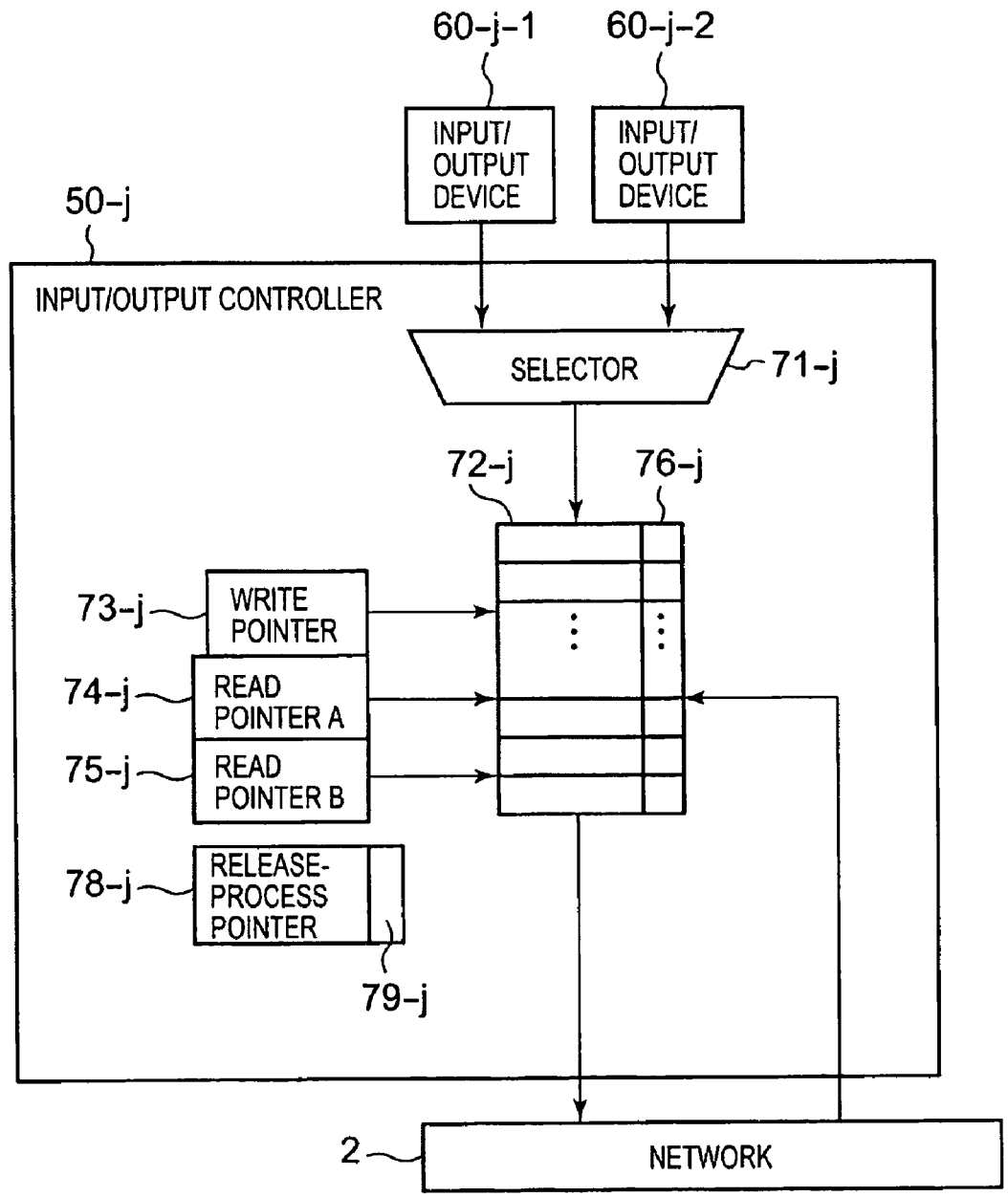
FIG. 14 is a diagram showing the structure of each input/output controller in a multiprocessor system according to a second embodiment of the present invention.

Each input/output controller in the multiprocessor system according to the present invention may be configured as shown in FIG. 14. The input/output controller 50-*j* with this structure will now be described with reference to FIG. 14.

The input/output controller 50-*j* shown in FIG. 14 is constructed such that a release-process pointer 78-*j* and a release-process flag 79-*j* are added to the input/output controller 50-*j* shown in FIG. 7. In an initial state, a value in the release-process flag 79-*j* is set to "0".

Since the fundamental operation in the second embodiment is the same as that in the first embodiment, the difference therebetween will now be described and the description of the same operation will be omitted. In a manner similar to the best mode for carrying out the invention, it is assumed that in the first input/output node 3-1 of the input/output nodes 3-1 to 3-*n*, the input/output devices 60-1-1 and 60-1-2 issue M write messages associated with first to M-th data (M is an integer of 2 or more), i.e., M data. An I-th write message will now be described below as an example.

Also referring to FIG. 4, in a case where write-locked information associated with an I-th data is stored in the directory 20-*i*, when receiving an I-th write-request message associated with the I-th data from the input/output controller 50-1, the memory controller 40-*i* outputs an I-th release-request message to the input/output controller 50-1 through the network 2 in response to the I-th write-request message. When receiving the I-th release-request message, the input/output controller 50-1 outputs the I-th write-request message to the memory controller 40-*i*. In addition, the input/output controller 50-1 updates a value in a release-process flag 79-1 (not shown) from "0" to "1" and sets a value in a release-process pointer 78-1 to information "I" indicative of an I-th write transaction. After that, the input/output controller 50-1 executes a release process, which will be described later.

The release-process flag 79-1 indicates whether the input/output controller 50-1 is executing the release process, which will be described below. On the other hand, the release-process pointer 78-1 (not shown) represents which write transaction has caused the release process. A value indicated by the release-process pointer 78-1 is also used to determine the order of the write transaction which has caused the release process and another write transaction (i.e., the write transaction precedes or follows another write transaction).

While the release-process flag 79-1 indicates the value "1", the input/output controller 50-1 executes the following process with respect to a K-th write transaction following the I-th write transaction. K is an integer that satisfies K=I+1, I+2, ..., M. I+1 is an integer that satisfies I<(I+1)<M. I+2 is an integer that satisfies (I+1)<(I+2).

If the input/output controller 50-1 has not yet issued a K-th write-request message, the controller suspends issuing of the K-th write-request message.

If the input/output controller 50-1 has already issued the K-th write-request message and received a K-th write-permission message, the controller operates as follows. The input/output controller 50-1 updates a value in the corresponding entry of the permission flag 76-1 (not shown) to "0" and outputs a K-th release message through the network 2 to a memory controller 40-*k* (not shown) in a processor node 1-*k* (k=1, 2, ..., m), serving as a home of the K-th data unit.

If the input/output controller 50-1 has already issued the K-th write-request message but has not yet received the K-th write-permission message, the controller does not update a value in the corresponding entry of the permission flag 76-1 to "1" but issues the K-th release message upon receiving the K-th write-permission message.

When receiving the K-th release message, the memory controller 40-*k* updates state information, associated with the corresponding data, held in a directory 20-*k* (not shown) from write-locked information to free-state information. In other words, a value in the corresponding block in the directory 20-*k* is updated from "W, 000" to "U, 000".

If the input/output controller 50-1 has already issued the K-th write-request message but has not yet received a K-th permission message, the controller operates in response to a received message as follows. When receiving the K-th write-permission message, the input/output controller 50-1 maintains the value "0" in the corresponding entry of the permission flag 76-1 and issues the K-th release message to the memory controller 40-*k*. When receiving a K-th inhibition message or a K-th release-request message, the input/output controller 50-1 does nothing.

While the value indicated by the release-process flag 79-1 is "1", the input/output controller 50-1 operates in the same way as the first embodiment with respect to first to (I−1)-th write transactions preceding the I-th write transaction. If the input/output controller 50-1 receives a release-request message in the preceding L-th write transaction, the controller outputs an L-th write-request message to the memory controller 40-1 through the network 2. L is an integer that satisfies 1≦L≦(I−1). In addition, the input/output controller 50-1 sets the value indicated by the release-process pointer 78-1 to information indicative of an L-th write transaction. The input/output controller 50-1 determines whether the current write transaction precedes or follows the L-th write transaction and then executes the above-described release process.

When receiving the I-th write-permission message associated with the write transaction (in this case, the I-th write transaction) represented by the value in the release-process pointer 78-1, the input/output controller 50-1 issues an I-th update message to the memory controller 40-*i*. In addition, the input/output controller 50-1 updates the value in the release-process flag 79-1 to "0" and terminates the release process.

With the above-described operation, e.g., when the input/output device 60-1-1 issues a write A message and a write C message in this order and the other input/output device 60-2-2 issues a write C message and a write A message in that order, a risk for deadlock can be prevented.

THIRD EMBODIMENT

The multiprocessor system according to the present invention can also execute the following operation.

As information to be stored in a directory (e.g., 20-*i*), interruptible write-locked information (hereinafter, referred to as Wi) exists in addition to the above-described state information. The interruptible write-locked information indicates a state in which a process for a specific message alone is acceptable. In addition, a field is added. The field indicates from which input/output node (e.g., 3-*j*) a message to change the state to an interruptible write-clocked state has been issued. For example, "Wi, 000, 2" indicates that the state has been changed to the interruptible write-locked state in accordance with a message issued from the input/output node 3-2.

Since the fundamental operation in the third embodiment is the same as that in the first embodiment, the difference therebetween will now be described and the description of the same operation will be omitted. In a manner similar to the best mode for carrying out the invention, it is assumed that in the first input/output node 3-1 of the input/output nodes 3-1 to 3-*n*, the input/output devices 60-1-1 and 60-1-2 issue M write messages associated with first to M-th data, i.e., M data. An I-th write message will now be described below as an example.

When receiving the I-th write message, the input/output controller 50-1 checks whether the controller has already received first to (I−1)-th write-permission messages, i.e., (I−1) write-permission messages. If the input/output controller 50-1 has already received the messages, the controller issues an I-th strong write-request message, or if not yet received the messages, the controller issues an I-th weak write-request message.

In a case where free-state information associated with an I-th data is stored in the directory 20-*i*, when receiving the I-th strong write-request message from the input/output controller 50-1, the memory controller 40-*i* operates as follows. The memory controller 40-*i* stores write-locked information in the directory 20-*i* instead of the free-state information. The write-locked information indicates that a read request or another strong or weak write-request message associated with the I-th data sent from a processor or an input/output device is not acceptable. In addition, the memory controller 40-*i* outputs an I-th write-permission message to the input/output controller 50-1 through the network 2.

In a case where free-state information associated with the I-th data is stored in the directory 20-*i*, when receiving the I-th weak write-request message from the input/output controller 50-1, the memory controller 40-*i* operates as follows. The memory controller 40-*i* stores interruptible write-locked information in the directory 20-*i* instead of the free-state information. The interruptible write-locked information indicates that a read request or another weak write-request message associated with the I-th data sent from a processor or an input/output device is not acceptable. In addition, the memory controller 40-*i* outputs an I-th write-permission message to the input/output controller 50-1 through the network 2.

In a case where write-locked information associated with the I-th data is stored in the directory 20-*i*, when receiving the I-th strong write-request message from the input/output controller 50-1, the memory controller 40-*i* outputs an I-th inhibition message to the input/output controller 50-1 through the network 2.

In a case where interruptible write-locked information or write-locked information associated with the I-th data is stored in the directory 20-*i*, when receiving the I-th weak write-request message from the input/output controller 50-1, the memory controller 40-*i* outputs an I-th inhibition message to the input/output controller 50-1 through the network 2.

When receiving the I-th inhibition message, the input/output controller 50-1 checks whether the controller has already received first to (I–1)-th write-permission messages, i.e., (I–1) write-permission messages. If the input/output controller 50-1 has already received the messages, the controller issues an I-th strong write-request message. Alternatively, if the input/output controller 50-1 has not yet received the messages, the controller issues an I-th weak write-request message.

In a case where interruptible write-locked information associated with the I-th data is stored in the directory 20-*i*, when receiving the I-th strong write-request message from the input/output controller 50-1, the memory controller 40-*i* stores request-locked information in the directory 20-*i* instead of the interruptible write-locked information. When information specifying an input/output controller stored in the directory 20-*i* indicates an input/output controller 50-2, the memory controller 40-*i* outputs an I-th retry-request message to the input/output controller 50-2 through the network 2.

When receiving the I-th retry-request message, the input/output controller 50-2 executes the following retry process.

First, the input/output controller 50-2 outputs an I-th release message to the memory controller 40-I-through the network 2.

Subsequently, if the input/output controller 50-2 has not yet issued an update message corresponding to a write message, which is addressed to the I-th data and whose corresponding write-permission message has already been received, of received write messages, the input/output controller 50-2 suspends issuing of the update message. In addition, after issuing the I-th release message, the input/output controller 50-2 issues a write-request message to the memory controller 40-*i*. The retry process then terminates.

When receiving the I-th release message, the memory controller 40-*i* stores write-locked information in the directory 20-*i* instead of the request-locked information. In addition, the memory controller 40-*i* outputs an I-th write-permission message to the input/output controller 50-1 through the network 2.

In a case where request-locked information associated with the I-th data is stored in the directory 20-*i*, when receiving an update message associated with the I-th data from the input/output controller 50-2, the memory controller 40-*i* updates a value in the corresponding data in the main memory 30-2 to a value specified in the update message.

According to a modification of the third embodiment, the system may be modified as follows.

The retry process executed by the input/output controller 50-2 which has received an I-th retry-request message will now be described. In this case, if the input/output controller 50-2 has not yet issued an update message corresponding to a write message, which is addressed to the I-th data and whose corresponding write-permission message has already been received, of received write messages, the input/output controller 50-2 issues an I-th release message. After that, the input/output controller 50-2 issues a write-request message to the memory controller 40-*i* and then terminates the process. If the input/output controller 50-2 has issued the update message, the controller terminates the process without doing anything.

When receiving the I-th release message, the memory controller 40-*i* stores write-locked information in the directory 20-*i* instead of request-locked information. In addition, the memory controller 40-*i* outputs an I-th write-permission message to the input/output controller 50-1 through the network 2.

In a case where request-locked information associated with the I-th data is stored in the directory 20-*i*, when receiving an update message associated with the I-th data from the input/output controller 50-2, the memory controller 40-*i* updates a value in the corresponding data in the main memory 30-2 to a value specified in the update message. In addition, the memory controller 40-*i* stores write-locked information in the directory 20-*i* instead of the request-locked information. After that, the memory controller 40-*i* outputs an I-th write-permission message to the input/output controller 50-1 through the network 2.

With the above-described structure and operation, a risk for deadlock can be prevented in a manner similar to the second embodiment.

As described above, in the multiprocessor system and the memory access processing method according to the present invention, each input/output controller can successively process a plurality of write messages sent from input/output devices to different processor nodes. Furthermore, in the multiprocessor system and the memory access processing method according to the present invention, since each input/output controller successively processes a plurality of write messages, the time required to process the write messages through the input/output controller can be reduced as compared with those of the conventional systems.

Several modes of the multiprocessor system according to the present invention will now be described below.

[First Mode]

A multiprocessor system includes a plurality of processor nodes connected to a network, a plurality of input/output nodes connected to the network, and a plurality of input/output controllers.

Each of the processor nodes includes a plurality of processors, a main memory for storing a plurality of data, a directory in which pieces of free-state information associated with the data are stored, and a memory controller connected to the processors, the main memory, and the directory. Each piece of free-state information indicates a state in which an access request associated with the corresponding data is acceptable.

Each of the input/output nodes includes a plurality of input/output devices which issue write messages.

When input/output devices in a first one of the input/output nodes issue M write messages associated with first to M-th (M is an integer of 2 or more) data, i.e., M data, a first one of the input/output controllers starts M write transactions for the M data. An I-th data (I is an integer that satisfies I=1, 2, . . . , M) of the M data is homed at a first one of the processor nodes. An I-th write message is a command to update a value in the I-th data of the data stored in a main memory in the first processor node to a value specified in the I-th write message. The first input/output controller outputs an I-th write-request message to the first processor node through the network as a process of the I-th write transaction.

When receiving the I-th write-request message, the memory controller in the first processor node stores write-locked information in a directory in the first processor node instead of free-state information associated with the I-th data. The write-locked information indicates a state in which a read request or another write-request message associated with the I-th data sent from a processor or an input/output device is not acceptable. The memory controller then outputs an I-th write-permission message to the first input/output controller in response to the I-th write-request message through the network.

When receiving the I-th write-permission message, the first input/output controller executes a process of issuing an update message for the I-th write transaction. In the update-message issuing process, the first input/output controller checks whether the controller has already received I write-permission messages for first to I-th write-permission transactions. If the first input/output controller has not yet received the I write-permission messages, the controller terminates the I-th update-message issuing process. If the first input/output controller has already received the I write-permission messages, the controller outputs an I-th update message, including a value specified in the I-th write message, to the first processor node through the network and then completes the I-th write transaction. If (I+1) is M or less, the first input/output controller executes a process of issuing an update message for an (I+1)-th write transaction. If (I+1) is more than M, the first input/output controller terminates the I-th update-message issuing process.

When receiving the I-th update message, the memory controller in the first processor node stores free-state information in the directory in the first processor node instead of the write-locked information associated with the I-th data. In addition, the first input/output controller updates the value in the I-th data stored in the main memory in the first processor node to the value specified in the I-th update message.

[Second Mode]

In the multiprocessor system in the first mode, the input/output controllers are included in the input/output nodes, respectively. The input/output controller in each input/output node includes a selector for arranging the M write messages issued by the input/output devices therein.

[Third Mode]

In the multiprocessor system in the first mode, the input/output controllers are connected to the network. Each of the input/output nodes includes a selector for arranging the M write messages issued by the input/output devices included therein.

[Fourth Mode]

In the multiprocessor system in the first mode, the input/output controllers are included in the processor nodes, respectively. Each of the input/output nodes includes a selector for arranging the M write messages issued by the input/output devices included therein.

[Fifth Mode]

In the multiprocessor system in the first mode, the processor nodes and the input/output nodes are combined into a plurality of nodes, respectively. Each of the nodes includes a selector for arranging the M write messages issued by the input/output devices included therein.

In the multiprocessor system in any one of the first to fifth modes, in a case where write-locked information associated with the I-th data is stored in the directory in the first processor node, when receiving an I-th write-request message associated with the I-th data from the first input/output controller, the memory controller in the first processor node outputs an I-th release-request message to the first input/output controller through the network in response to the I-th write-request message.

In response to the I-th release-request message, the first input/output controller outputs the I-th write-request message to the memory controller in the first processor node through the network and also executes a release process.

In the release process, the first input/output controller checks the progress of a K-th write transaction {K is an integer that satisfies K=I+1, I+2, . . . , M, I+1 is an integer that satisfies I<(I+1)<M, and I+2 is an integer that satisfies (I+1) <(I+2)<M}.

If the first input/output controller has not yet issued a K-th write-request message, the controller suspends issuing of the K-th write-request message.

If the first input/output controller has already issued the K-th write-request message and received a K-th write-permission message, the controller outputs a K-th release message to a second processor node, serving as a home of a K-th data, through the network.

If the first input/output controller has already issued the K-th write-request message but has not yet received the K-th write-permission message, the controller issues the K-th release message upon receiving the K-th write-permission message.

When receiving the K-th release message, a memory controller in the second processor node stores free-state information in a directory in the second processor node instead of write-locked information associated with the K-th data.

[Seventh Mode]

In the multiprocessor system in any of the first to fifth modes, state information stored in each directory further includes interruptible write-locked information and request-locked information.

Before issuing an I-th write-request message, the first input/output controller checks whether the controller has already received first to (I−1)-th write-permission messages, i.e., (I−1) write-permission messages. If the first input/output controller has already received the messages, the controller issues an I-th strong write-request message. Alternatively, if the first input/output controller has not yet received the messages, the controller issues an I-th weak write-request message.

In a case where state information associated with the I-th data stored in the directory in the first processor node is free-state information, when receiving the I-th strong write-request message from the first input/output controller, the memory controller in the first processor node stores write-locked information in the directory in the first processor node instead of the free-state information. The write-locked information indicates a state in which a read request or another strong or weak write-request message associated with the I-th data sent from a processor or an input/output controller is not acceptable. Then, the memory controller in the first processor node outputs an I-th write-permission message to the first input/output controller through the network.

In a case where state information associated with the I-th data stored in the directory in the first processor node is free-state information, when receiving the I-th weak write-request message from the first input/output controller, the memory controller in the first processor node stores interruptible write-locked information in the directory in the first processor node instead of the free-state information. The interruptible write-locked information indicates a state in which a read request or another weak write-request message associated with the I-th data sent from a processor or an input/output controller is not acceptable. Then, the memory controller in the first processor node outputs an I-th write-permission message to the first input/output controller through the network.

The interruptible write-locked information includes information to specify an input/output controller which has issued the weak write-request message causing this state.

In a case where state information associated with the I-th data stored in the directory in the first processor node is write-locked information or request-locked information, when receiving the I-th strong write-request message from the first input/output controller, the memory controller in the first processor node outputs an I-th inhibition message to the first input/output controller through the network.

In a case where state information associated with the I-th data stored in the directory in the first processor node is any of interruptible write-locked information, write-locked information, and request-locked information, when receiving the I-th weak write-request message from the first input/output controller, the memory controller in the first processor node outputs an I-th inhibition message to the first input/output controller through the network.

When receiving the I-th inhibition message, the first input/output controller checks whether the controller has already received the first to (I−1)-th write-permission messages, i.e., the (1-1) write-permission messages. If the first input/output controller has already received the messages, the controller issues an I-th strong write-request message. If the first input/output controller has not yet received the messages, the controller issues an I-th weak write-request message.

In a case where state information associated with the I-th data stored in the directory in the first processor node is interruptible write-locked information, when receiving the I-th strong write-request message from the first input/output controller, the memory controller in the first processor node stores request-locked information in the directory in the first processor node instead of the interruptible write-locked information. The request-locked information indicates a state in which a read request or another weak write-request message associated with the I-th data sent from a processor or an input/output device is not acceptable. The memory controller in the first processor node outputs an I-th retry-request message to a second input/output controller, designated by the information to specify an input/output controller stored in the directory, through the network.

When receiving the I-th retry-request message, the second input/output controller executes a retry process.

[Eighth Mode]

In the multiprocessor system in the seventh mode, the second input/output controller executes the following retry process.

First, the second input/output controller outputs an I-th release message to the memory controller in the first processor node through the network. Subsequently, if the second input/output controller has not yet issued an update message for a write transaction, which is associated with the I-th data and whose corresponding write-permission message has already been received, of write transactions, the controller suspends issuing of an update message. After issuing the I-th release message, the second input/output controller issues a write-request message to the first processor node. When the first processor node receives the I-th release message, the memory controller in the processor node stores write-locked information in the directory therein instead of request-locked information and then outputs an I-th write-permission message to the first input/output controller through the network.

[Ninth Mode]

A memory access processing method according to the present invention is applied to the following multiprocessor system. A multiprocessor system includes a plurality of processor nodes, a plurality of input/output nodes, and a plurality of input/output controllers. Each of the processor nodes includes a plurality of processors, a main memory for storing a plurality of data, a directory in which pieces of free-state information associated with the data are stored, and a memory controller connected to the processors, the main memory, and the directory. Each piece of the free-state information indicates a state in which an access request associated with the corresponding data is acceptable. Each of the input/output nodes includes a plurality of input/output devices which issue write messages.

In the present memory access processing method, when input/output devices in a first one of the input/output nodes issue M write messages associated with first to M-th (M is an integer of 2 or more) data, i.e., M data, a first one of the input/output controllers starts M write transactions for the M data.

An I-th data (I is an integer that satisfies I=1, 2, . . . , M) of the M data is homed at a first one of the processor nodes. An I-th write message is a command to update a value in the I-th data of the data stored in the main memory in the first processor node to a value specified in the I-th write message.

The method includes a step where the first input/output controller outputs an I-th write-request message to the first processor node as processing of an I-th write transaction.

The method further includes the following step. When receiving the I-th write-request message, a memory controller in the first processor node stores write-locked information in a directory in the first processor node instead of free-state information. The write-locked information indicates a state in which a read request or another write-request message associated with the I-th data sent from a processor or an input/output device is not acceptable, and then outputs an I-th write-permission message to the first input/output controller in response to the I-th write-request message.

The method further includes the following step. When receiving the I-th write-permission message, the first input/output controller executes a process of issuing an update message as processing of the I-th write transaction.

The update-message issuing process executed by the first input/output controller includes a substep of checking whether first to I-th write-permission messages, i.e., I write messages have already been received.

The process further includes the following substeps. If the I write-permission messages have not yet been received, the process of issuing an I-th update message is terminated. If the I write-permission messages have already been received, the I-th update message including a value specified in the I-th write message is output to the first processor node, thus completing the I-th write transaction. If (I+1) is M or less, a process of issuing an update message associated with an (I+1)-th write transaction is executed. If (I+1) is larger than M, the process of issuing the I-th update message is terminated.

The method further includes the following step. When receiving the I-th update message, the memory controller in the first processor node stores free-state information instead of the write-locked information associated with the I-th data and also updates the value in the I-th data stored in the main memory in the first processor node to the value specified in the I-th update message.

[Tenth Mode]

In the memory access processing method in the ninth mode, the method further includes a step of arranging the M write messages issued by the input/output devices in each input/output nodes.

[Eleventh Mode]

In the memory access processing method according to the ninth or tenth mode, the method further includes the following step. In a case where write-locked information associated with the I-th data is stored in the directory in the first processor node, when receiving the I-th write-request message associated with the I-th data from the first input/output controller, the memory controller in the first processor node outputs an I-th release-request message to the first input/output controller in response to the I-th write-request message. The method further includes a step in which the first input/output controller outputs the I-th write-request message to the memory controller in the first processor node in response to the I-th release-request message and executes a release process.

The step of executing the release process includes a substep of checking the progress of a K-th write transaction {K is an integer that satisfies K=I+1, I+2, ..., M, I+1 is an integer that satisfies I<(I+1)<M, and I+2 is an integer that satisfies (I+1) <(I+2)<M} associated with a K-th data following the I-th data. If a K-th write-request message has not yet been issued, issuing the K-th write-request message is suspended.

The step of executing the release process further includes the following substeps. If the K-th write-request message has already been issued and a K-th write-permission message has already been received, a K-th release message is output to a memory controller in a second processor node, serving as a home of the K-th data unit. If the K-th write-request message has already been issued but the K-th write-permission message has not yet been received, the K-th release message is issued upon receiving the K-th write-permission message.

The method further includes a step in which when receiving the K-th release message, the memory controller in the second processor node stores free-state information in a directory in the second processor node instead of write-locked information associated with the I-th data.

[Twelfth Mode]

In the memory access processing method in the ninth or tenth mode, state information stored in each directory further includes interruptible write-locked information and request-locked information.

The method further includes the following step. Before the first input/output controller issues an I-th write-request message, it is checked whether first to (I−1)-th write-permission messages, i.e., the (I−1) write-permission messages have already been received. If the messages have already been received, an I-th strong write-request message is issued. If the messages have not yet been received, an I-th weak write-request message is issued.

The method further includes the following step. In a case where state information, associated with the I-th data, stored in the directory in the first processor node is free-state information, when the memory controller in the first processor node receives the I-th strong write-request message from the first input/output controller, write-locked information is stored in the directory of the first processor node instead of the free-state information. The write-locked information indicates a state in which a read request or another strong or weak write-request message associated with the I-th data sent from a processor or an input/output device is not acceptable. Then, an I-th write-permission message is output to the first input/output controller.

The method further includes the following step. In a case where state information, associated with the I-th data, stored in the directory of the first processor node is free-state information, when the memory controller in the first processor node receives the I-th weak write-request message from the first input/output controller, interruptible write-locked information is stored in the directory in the first processor node instead of the free-state information. The interruptible write-locked information indicates a state in which a read request or another weak write-request message associated with the I-th data sent from a processor or an input/output device is not acceptable. Then, an I-th write-permission message is output to the first input/output controller.

The interruptible write-locked information includes information to specify an input/output controller which has issued the weak write-request message causing this state.

The method further includes the following step. In a case where state information, associated with the I-th data, stored in the directory in the first processor node is write-locked information or request-locked information, when the memory controller in the first processor node receives the I-th strong write-request message from the first input/output controller, an I-th inhibition message is output to the first input/output controller.

The method further includes the following step. In a case where state information, associated with the I-th data, stored in the directory in the first processor node is interruptible write-locked information, write-locked information, or request-locked information, when the memory controller in the first processor node receives the I-th weak write-request message from the first input/output controller, an I-th inhibition message is output to the first input/output controller.

The method further includes the following step. When the first input/output controller receives the I-th inhibition message, it is checked whether the controller has already received the first to (I−1)-th write-permission messages, i.e., the (I−1) write-permission messages. If the first input/output controller has already received the messages, an I-th strong write-request message is issued. If the controller has not yet received the messages, an I-th weak write-request message is issued.

The method further includes the following step. In a case where state information, associated with the I-th data, stored in the directory in the first processor node is interruptible write-locked information, when the memory controller in the first processor node receives the I-th strong write-request message from the first input/output controller, request-locked information is stored in the directory in the first processor node instead of the interruptible write-locked information. The request-locked information indicates a state in which a read request or another weak write-request message associated with the I-th data sent from a processor or an input/output device is not acceptable. Then, an I-th retry-request message is output to the second input/output controller designated by information to satisfy an input/output controller, the information being stored in the directory.

The method further includes a step in which the second input/output controller executes a retry process in response to the received I-th retry-request message.

[Thirteenth Mode]

In the memory access processing method in the twelfth mode, the retry process executed by the second input/output controller includes a substep of outputting an I-th release message to the memory controller in the first processor node.

The retry process further includes the following substep. If an update message for a write transaction, which is associated with the I-th data and whose corresponding write-permission message has already been received, of write transactions has not yet been issued, issuing the update message is suspended. After issuing an I-th release message, a write-request message is issued to the first processor node.

The retry process further includes the following substep. In response to the received I-th release message, the memory controller in the first processor node stores write-locked information in the directory thereof instead of request-locked information and then outputs the I-th write-permission message to the first input/output controller.

The invention claimed is:

1. A processor system comprising a plurality of resource nodes connected to a network, a plurality of control nodes connected to the network, and a plurality of controllers, wherein each of the resource nodes includes a resource holding unit for holding a plurality of resources and a resource information holding unit for managing the states of the resources, each state indicating that the corresponding resource is in a free or locked state, each of the control nodes includes a plurality of control devices for issuing a plurality of requests associated with resources, each control node, including the control devices which have issued requests, transferring the requests to the corresponding controller, and wherein at least one controller, which has received the requests, issues a request message to each of resource nodes which hold target resources associated with the requests, each resource node which has received the request message checks that the target resource is in the free state, and if the target resource is in the free state, changes the state of the target resource to the locked state, and issues a permission message to the at least one controller, the at least one controller, which has received the permission message, checks that all of permission messages associated with other requests preceding the corresponding request received by the at least one controller have already been received and issues an update message to the resource node which holds the target resource associated with the corresponding request, and the resource node which has received the update message changes the state of the target resource to the free state.

2. The processor system according to claim 1, herein the controllers are included in the control nodes, respectively, and the controller in each control node includes a selector for arranging the requests issued by the control devices in the control node.

3. The processor system according to claim 1, wherein the controllers are connected to the network, and each control node includes a selector for arranging the requests issued by the control devices in the control node.

4. The processor system according to claim 1, wherein the controllers are included in the resource nodes, respectively, and each control node includes a selector for arranging the requests issued by the control devices in the control node.

5. The processor system according to claim 1, wherein the resource nodes and the control nodes are combined into a plurality of nodes, respectively, and each node includes a selector for arranging the requests issued by the control devices in the node.

6. The processor system according to any one of claim 1 wherein each controller includes a release processing unit, each resource node which has received the request message issues a release-request message to the at least one controller when the target resource is in the locked state, the release processing unit in the at least one controller starts a release process in response to the received release-request message, the release process includes:

issuing a request message for the request corresponding to the release-request message;

stopping accepting of a new request; and issuing a release message to each of resource nodes which hold target resources associated with requests following the corresponding request when permission messages associated with the following requests have already been received or are received during the release process, the release processing unit terminates the release process when receiving a permission message corresponding to the release-request message, and the resource node which has received the release message changes the state of the target resource to the free state.

7. The processor system according to any one of claim 1, wherein each state managed by the resource information holding unit includes an interruptible locked state and a request-locked state, the at least one controller, which has received the request, issues a weak request message when all of permission messages associated with other requests preceding the request received by the at least one controller have not yet been received, the resource node which has received the weak request message checks that the target resource is in the free state, changes the state of the target resource to the interruptible locked state, and issues a permission message to the at least one controller, the interruptible locked state includes information to specify the at least one controller, the resource node which has received the request message issues an inhibition message to the at least one controller when the target resource is in the locked state, the resource node which has received the weak request message issues an inhibition message to the at least one controller when the target resource is in the locked state or the interruptible locked state, the at least one controller which has received the inhibition message issues, for the request corresponding to the inhibition message, a request message when all of permission messages associated with other requests preceding the request have already been received, or issues a weak request message when all of the permission messages have not yet been received, when the target resource is in the interruptible locked state, the resource node which has received the request message changes the state of the target resource to the request-locked state and then outputs a retry-request message to a controller designated by the information included in the interruptible locked state, the controller which has received the retry-request message executes a retry process, the retry process includes:

specifying a request associated with the target resource;

issuing a release message to the resource node which holds the target resource associated with the specified request; and changing the state of the specified request to a state in which a permission message associated therewith has not yet been received when an update message has not yet been issued in response to the specified request, and issuing a request message when all of permission messages associated with other requests preceding the specified request received by the controller have already been received, or issuing a weak request message when all of the permission messages have not yet been received, and the resource node which has received the release message changes the state of the target resource to the locked state and issues a permission message to the at least one controller.

8. A method for processing access, the method being applied to a processor system including a plurality of resource nodes connected to a network, a plurality of control nodes connected to the network, and a plurality of controllers, each of the resource nodes including a resource holding unit for holding a plurality of resources and a resource information holding unit for managing the states of the resources, each state indicating that the corresponding resource is in a free or locked state, each of the control nodes including a plurality of control devices for issuing a plurality of requests associated with resources, wherein:

the control device transfers requests to at least one corresponding controller;

the at least one controller issues, in response to the request, a request message to each resource node which holds the target resource associated with the corresponding request, the resource node checks, in response to the request message, whether the target resource is in the free state, and if the target resource is in the free state, changes the state of the target resource to the locked state, and issues a permission message to the at least one controller;

the at least one controller checks, in response to the permission message, whether all of permission messages associated with other requests preceding the corresponding request received by the at least one controller have already been received and issues an update message to the resource node which holds the target resource associated with the corresponding request; and the resource node changes, in response to the update message, the state of the target resource to the free state.

9. The method for processing access according to claim 8, further comprising the step of:

arranging the requests issued by the control devices in each control node.

10. The method for processing access according to claim 8, further comprising the steps of:

combining the resource nodes and the control nodes into a plurality of nodes, respectively; and arranging the requests issued by the control devices in each node.

11. The method for processing access according to claim 8, further comprising the steps of:

in response to the request message to the resource node, issuing a release-request message to the at least one controller when the state of the target resource is in the locked state; and starting a release process in the at least one controller which has received the release-request message, wherein the release process includes the substeps of:

issuing a request message to the request corresponding to the release-request message;

stopping accepting of a new request; and issuing a release message to each of resource nodes which hold target resources associated with requests following the corresponding request when permission messages associated with the following requests have already been received or are received during the release process, and the method further includes the step of terminating the release process in the at least one controller which has received a permission message sent in response to the request corresponding to the release-request message; and changing, in response to the release message to the resource node, the state of the target resource to the free state.

12. The method for processing access according to claim 8, wherein each state managed by the resource information holding unit includes an interruptible locked state and a request-locked state, the method further comprises the steps of:

in response to the request, issuing, by the at least one controller, a weak request message when all of permission messages associated with other requests preceding the corresponding request have not yet been received; and in response to the weak request message, checking, by the resource node, whether the target resource is in the free state, changing the state of the target resource to the interruptible locked state, and issuing a permission message to the at least one controller, the interruptible locked state includes information to specify the at least one controller, the method further includes the steps:

in response to the request message, issuing, by the resource node, an inhibition message to the at least one controller when the target resource is in the locked state;

in response to the weak request message, issuing, by the resource node, an inhibition message to the at least one controller when the target resource is in the locked state or the interruptible locked state;

in response to the inhibition message, issuing, by the at least one controller, a request message for the request corresponding to the inhibition message when all of permission messages associated with other requests preceding the corresponding request have already been received, or issuing a weak request message when all of the permission messages have not yet been received;

in response to the request message, changing, by the resource node, the state of the target resource to the request-locked state when the target resource is in the interruptible locked state, and outputting a retry-request message to a controller designated by the information included in the interruptible locked state; and in response to the retry request message, executing, by the controller, a retry process, the retry process comprises the substeps of:

specifying a request associated with the target resource;

issuing a release message to the resource node which holds the target resource associated with the specified request; and changing the state of the specified request to a state in which a permission message associated therewith has not yet been received when an update message has not yet been issued in response to the specified request, and issuing a request message when all of permission messages associated with other requests preceding the specified request received by the controller have already been received, or issuing a weak request message when all of the permission messages have not yet been received, and the method further includes the step of:

in response to the release message, changing, by the resource node, the state of the target resource to the locked state and issuing a permission message to the at least one controller.

* * * * *

UNITED STATES PATENT AND TRADEMARK OFFICE
CERTIFICATE OF CORRECTION

| | |
|---|---|
| PATENT NO. | : 7,664,900 B2 |
| APPLICATION NO. | : 10/586153 |
| DATED | : February 16, 2010 |
| INVENTOR(S) | : Takeo Hosomi and Yoshiaki Watanabe |

It is certified that error appears in the above-identified patent and that said Letters Patent is hereby corrected as shown below:

Column 1, Line 28, Delete "101-i, and" and insert --101-i,..., and--

Column 1, Line 31, Delete "(and n" and insert --(j and n--

Column 11, Line 65, Delete "each indicate Referring" and insert --each indicate "o". ¶ Referring--

Column 30, Line 3, Delete "herein" and insert --wherein,--

Signed and Sealed this

Twenty-fourth Day of August, 2010

David J. Kappos
*Director of the United States Patent and Trademark Office*